(12) United States Patent
Xiong et al.

(10) Patent No.: US 11,894,571 B1
(45) Date of Patent: Feb. 6, 2024

(54) ADAPTER ASSEMBLY, ENERGY STORAGE DEVICE, AND POWER CONSUMING APPARATUS

(71) Applicants: Shenzhen Hithium Energy Storage Technology Co., Ltd., Guangdong (CN); Xiamen Hithium Energy Storage Technology Co., Ltd., Fujian (CN)

(72) Inventors: Yongfeng Xiong, Guangdong (CN); Jinqiang Chen, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

(*) Notice: Subject to any disclaimer, the term of this patent is extended or adjusted under 35 U.S.C. 154(b) by 0 days.

(21) Appl. No.: 18/231,106

(22) Filed: Aug. 7, 2023

(30) Foreign Application Priority Data

Feb. 9, 2023 (CN) .......................... 202310091064.6

(51) Int. Cl.
*H01M 50/291* (2021.01)
*H01M 10/653* (2014.01)
(Continued)

(52) U.S. Cl.
CPC ....... *H01M 50/291* (2021.01); *H01M 10/653* (2015.04); *H01M 50/531* (2021.01); *H01M 50/552* (2021.01)

(58) Field of Classification Search
CPC ............ H01M 50/531; H01M 50/291; H01M 10/653; H01M 50/552
See application file for complete search history.

(56) References Cited

U.S. PATENT DOCUMENTS

2014/0254065 A1   9/2014  Rustomji et al.
2022/0393315 A1* 12/2022  Chen .................. H01M 50/536

FOREIGN PATENT DOCUMENTS

CN   201741650 U   2/2011
CN   108598355 A   9/2018
(Continued)

OTHER PUBLICATIONS

CNIPA, First Office Action for Chinese Patent Application No. 202310091064.6, dated Apr. 4, 2023, 22 pages.
(Continued)

*Primary Examiner* — Nicholas P D'Aniello
*Assistant Examiner* — Mary G Henshaw
(74) *Attorney, Agent, or Firm* — IP Spring

(57) ABSTRACT

An adapter assembly, an energy storage device and a power consuming apparatus are provided. The adapter assembly includes an adapter and a limiting member. The adapter includes a first connecting portion, a second connecting portion, and a bendable connecting portion connected between the first connecting portion and the second connecting portion. The limiting member is located between the first connecting portion and the second connecting portion foldable with respect to each other, and is insulated from the adapter. The limiting member has a limiting face configured to abut against the bendable connecting portion, and the bendable connecting portion is configured to rotate and bend around the limiting face.

20 Claims, 12 Drawing Sheets

(51) Int. Cl.
*H01M 50/552* (2021.01)
*H01M 50/531* (2021.01)

(56) References Cited

FOREIGN PATENT DOCUMENTS

| CN | 207818806 U | 9/2018 |
| CN | 207938702 U | 10/2018 |
| CN | 112242593 A | 1/2021 |
| CN | 212303847 U | 1/2021 |
| CN | 214013113 U | 8/2021 |
| CN | 214336804 U | 10/2021 |
| CN | 215816085 U | 2/2022 |
| CN | 115566375 A | 1/2023 |

OTHER PUBLICATIONS

CNIPA, Notice of Allowance for Chinese Patent Application No. 202310091064.6, dated Apr. 21, 2023, 11 pages.
WIPO, International Search Report and Written Opinion for International Patent Application No. PCT/CN2023/075258, Sep. 1, 2023, 14 pages.

\* cited by examiner

ADAPTER ASSEMBLY, ENERGY STORAGE DEVICE, AND POWER CONSUMING APPARATUS

CROSS-REFERENCE TO RELATED APPLICATION(S)

This application claims priority under 35 U.S.C. § 119(a) to and the benefit of Chinese Patent Application No. 202310091064.6, filed Feb. 9, 2023, the entire disclosure of which is incorporated herein by reference.

TECHNICAL FIELD

The present disclosure relates to the technical field of energy storage, and in particular to an adapter assembly, an energy storage device, and a power consuming apparatus.

BACKGROUND

Energy storage devices have high requirements for their performance. In the related art, the energy storage device includes a terminal post arranged at an electrode assembly and a tab arranged at a top cover, and it is necessary for the tab to be connected to and electrically conducted with the terminal post via an adapter. Specifically, during assembling of the energy storage device, two side portions of the adapter are respectively connected to the terminal post and the tab, and then the two side portions of the adapter are folded with respect to each other, to enable the adapter to be received between the electrode assembly and the top cover. However, how to prolong the service life of the energy storage device has become an urgent problem to be solved.

SUMMARY

In a first aspect, an implementation of the present disclosure provides an adapter assembly, including: an adapter, including a first connecting portion, a second connecting portion, and a bendable connecting portion connected between the first connecting portion and the second connecting portion, the first connecting portion being arranged opposite the second connecting portion; and a limiting member, which is located between the first connecting portion and the second connecting portion foldable with respect to each other, and which is configured to be insulated from the adapter, where the limiting member has a limiting face configured to abut against the bendable connecting portion, and the bendable connecting portion is configured to rotate and bend around the limiting face. The limiting member includes a limiting body and a movable rotary cover rotatably connected to the limiting body, the first connecting portion includes a first welding area, the limiting body defines a window for exposing the first welding area, the adapter assembly further includes a first insulating film, and the first insulating film is arranged at the window and shields the window. The first insulating film is clamped between the limiting body and the movable rotary cover. The limiting body is fixed to the first connecting portion via the first insulating film. Side walls of the window and the first insulating film enclose a storage tank. The movable rotary cover includes a fixing portion connected to the limiting body, and an extension portion connected to one side of the fixing portion facing away from the limiting body. The extension portion shields part of the window.

In a second aspect, an implementation of the present disclosure provides an energy storage device, including a terminal post, a tab, and an adapter assembly as described above, where the first connecting portion of the adapter assembly is electrically connected to the terminal post, and the second connecting portion of the adapter assembly is electrically connected to the tab, so as to prolong the service life of the energy storage device.

In a third aspect, an implementation of the present disclosure provides a power consuming apparatus, including an energy storage device as described above, the energy storage device supplying electric energy to the power consuming apparatus, so as to prolong the service life of the power consuming apparatus.

BRIEF DESCRIPTION OF THE DRAWINGS

In order to more clearly describe the technical solutions in the implementations of the present disclosure or in the prior art, the drawings required for describing the implementations or the prior art will be briefly described below. Apparently, the drawings in the following description merely show some of the implementations of the present disclosure, and those of ordinary skill in the art would have obtained other drawings according to these drawings without involving any inventive effort.

DESCRIPTION OF MAIN REFERENCE SIGNS

Figure 1:
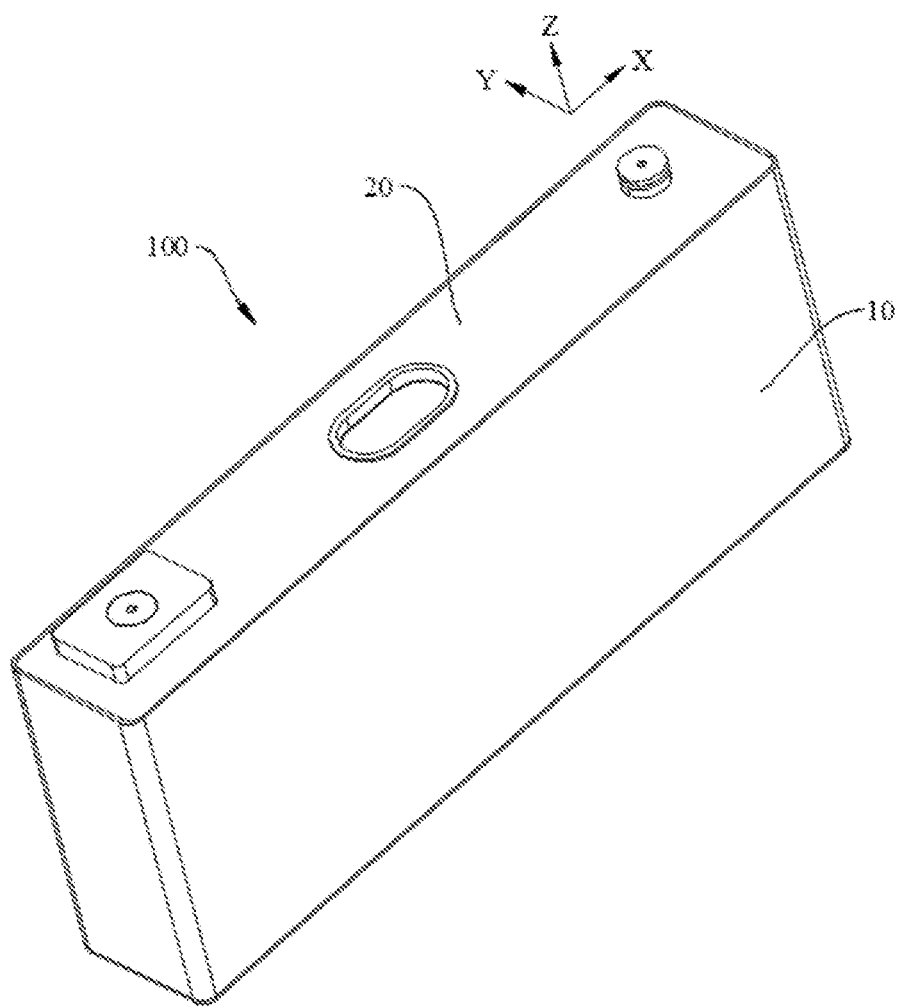
FIG. 1 is a schematic structural diagram of an energy storage device provided in an implementation of the present disclosure.

Power consuming apparatus 200; Energy storage device 100; Housing 10; Opening 101; Receiving cavity 102; End cap assembly 20; End cap 201; Terminal post 202; Electrode assembly 30; Battery cell 301; Tab 302; First connecting section 3021; Second connecting section 3022; Third connecting section 3023; Adapter assembly 40; Lower plastic member Limiting groove 501; Limiting boss 502; Adapter 1;

First half-folding axis P1; Second half-folding axis P2; Adapter main body 110; Gap 120; Arc-shaped structure 130; First connecting portion 11; First welding area 111; First non-welding area 112; Second connecting portion 13; Second welding area 131; Second non-welding area 132; First connecting plate 133; Second connecting plate 134; Insertion space 135; Bendable connecting portion 15; Through hole 150; First linear section 1501; First corner section 1502; Second corner section 1503; Second linear section 1504; Third linear section 1505; Fourth linear section 1506; First distance D1; Second distance D2; Third distance D3; Fourth distance D4; Fifth distance D5; Sixth distance D6; Seventh distance D7; First length L1; Second length L2; First fuse portion 151; Second fuse portion 152; Fusing direction F11; Fusing direction F12; Bending direction F2; Limiting member 3; Limiting face 310; Limiting body 31; Window 311; Storage tank 312; Movable rotary cover 33; Notch 330; Fixing portion 331; Extension portion 332; Thickness H; Thickness T; Length C1; Length C2; Length C3; Length C4; Width W1; Width W2; First insulating film 5; Second insulating film 6; First film body 61; Second film body 62.

The present disclosure will be further described below with reference to the accompanying drawings.

DETAILED DESCRIPTION

The technical solutions in the implementations of the present disclosure will be clearly and completely described below with reference to the accompanying drawings of the implementations of the present disclosure. Apparently, the implementations described are merely some rather than all of the implementations of the present disclosure. Based on the implementations of the present disclosure, all other implementations obtained by those of ordinary skill in the art without any creative effort fall within the scope of protection of the present disclosure.

It can be understood that the terms in the specification, the claims and the above drawings of the present disclosure are only for describing specific implementations, and are not intended to limit the present disclosure. The terms such as "first" and "second" in the specification and the claims of the present disclosure as well as in the above-mentioned accompanying drawings are used to distinguish different objects, rather than to describe a specific order. The singular forms "a", "an" and "the" are also intended to include the plural forms, unless the context clearly states otherwise. The terms "include" and any variations thereof are intended to cover a non-exclusive inclusion. In addition, the present disclosure may be implemented in many different forms and is not limited to the implementations described herein. The purpose of providing the following specific implementations is to facilitate a clearer and more thorough understanding of the disclosure of the present disclosure, where the words indicating orientations such as up, down, left, and right are only for the positions of the structures shown in the corresponding drawings. In the description of the present disclosure, it should also be noted that the terms "mounting", "connecting", "connection", and "arranged on . . . " should be interpreted in the broad sense unless explicitly defined and limited otherwise. For example, the terms may mean a fixed connection, a detachable connection, or an integral connection, or may mean a mechanical connection; may be a direct connection, or an indirect connection by means of an intermediate medium, or communication between interiors of two elements. For those of ordinary skill in the art, the specific meaning of the terms mentioned above in the present disclosure can be construed according to specific circumstances.

Implementations for implementing the present disclosure are subsequently described in the specification, but the above description is for the purpose of illustrating the general principles of the present disclosure, and is not intended to limit the scope of the present disclosure. The scope of protection of the present disclosure shall be subject to the appended claims.

In view of this, an objective of the present disclosure is to provide an adapter assembly, an energy storage device and a power consuming apparatus, so as to solve the problem of low service life of the energy storage device.

In a first aspect, an implementation of the present disclosure provides an adapter assembly, including: an adapter, including a first connecting portion, a second connecting portion, and a bendable connecting portion connected between the first connecting portion and the second connecting portion, the first connecting portion being arranged opposite the second connecting portion; and a limiting member, which is located between the first connecting portion and the second connecting portion foldable with respect to each other, and which is configured to be insulated from the adapter, where the limiting member has a limiting face configured to abut against the bendable connecting portion, and the bendable connecting portion is configured to rotate and bend around the limiting face. The limiting member includes a limiting body and a movable rotary cover rotatably connected to the limiting body, the first connecting portion includes a first welding area, the limiting body defines a window for exposing the first welding area, the adapter assembly further includes a first insulating film, and the first insulating film is arranged at the window and shields the window. The first insulating film is clamped between the limiting body and the movable rotary cover, thereby reducing the displacement or detachment of the first insulating film during the movement of the energy storage device, and improving the assembly efficiency of the first insulating film. The limiting body is fixed to the first connecting portion via the first insulating film. In this way, the connection strength between the first insulating film and the first connecting portion is increased to further reduce the displacement or detachment of the first insulating film during the movement of the energy storage device. Moreover, the position of the limiting member is defined, so as to ensure that the bendable connecting portion can be rotated and bent around the limiting face of the limiting member, and to improve the assembly efficiency of the limiting body. Side walls of the window and the first insulating film enclose a storage tank. The movable rotary cover includes a fixing portion connected to the limiting body, and an extension portion connected to one side of the fixing portion facing away from the limiting body. The extension portion shields part of the window.

The adapter assembly provided in the implementation of the present disclosure is based on adding a limiting member between the first connecting portion and the second connecting portion which can be folded with respect to each other, and the limiting member can buffer the bendable connecting portion, so that the limiting member can absorb and disperse the stress of the bendable connecting portion during bending, so as to improve the structural stress strength of the bendable connecting portion during the bending, and the problem of breakage of the bendable connecting portion due to excessive stress can thus be effectively avoided, thereby prolonging the service life. In addition, the first insulating film can prevent the risk of a short circuit caused by metal chips such as welding slag and rusty slag at the first connecting portion falling into the energy storage device, facilitating the improvement of the yield and safety of the energy storage device. Moreover, the first insulating film can further avoid the problem of short circuit caused by contact between the first connecting portion and the second connecting portion.

In some implementations of the present disclosure, the limiting member has a thickness of 0.03 mm-5 mm in a thickness direction of the adapter assembly. In this way, stress fatigue or even breakage of the bendable connecting portion of the adapter is avoided during the bending, and the reliability of use of the adapter is improved. Moreover, the space occupied by the limiting member is reduced in the thickness direction of the adapter assembly, effectively reducing the thickness of the adapter assembly, and further adapting to the market demand for the miniaturization of the adapter assembly.

In some implementations of the present disclosure, the limiting body is configured to abut against the first connecting portion, and the movable rotary cover is configured to abut against the second connecting portion. The bending range of the bendable connecting portion is limited by the bending range of the movable rotary cover relative to the limiting body, so as to avoid the breakage of the bendable connecting portion during the bending. Moreover, the movable rotary cover is rotatably connected to the limiting body, so as to avoid the recessed deformation of a surface of the limiting member under pressure, so that the limiting member has a good pressure resistance capacity, thereby improving the buffering effect of the limiting member on the bendable connecting portion.

In some implementations of the present disclosure, the first connecting portion, the limiting body, the movable rotary cover and the second connecting portion are stacked in sequence in the thickness direction of the adapter assembly, so that the overall structure of the adapter assembly is more compact, achieving beneficial effects such as saving space, and facilitating the mounting and dismounting of the limiting member.

In some implementations of the present disclosure, the limiting body is integrally formed with the movable rotary cover, and the limiting member is configured as a bendable structure. The connection strength between the limiting body and the movable rotary cover is increased, the assembly efficiency between the limiting member and the adapter is improved, and the processing and production process of the limiting member is facilitated. Moreover, the movable rotary cover can weaken the squeezing force of the limiting member from the bendable connecting portion.

In some implementations of the present disclosure, a ratio of a length of the window to a length of the limiting body is 0.2-0.5, so as to prevent the limiting member from being misaligned with the first connecting portion due to the displacement caused by vibration during transportation of the energy storage device, thereby effectively blocking the welding slag of the first connecting portion and improving the safety of the energy storage device.

In some implementations of the present disclosure, the limiting body is adhesively fixed to the first connecting portion, so as to increase the connection strength between the limiting member and the adapter, to better fix the relative position of the limiting member, thereby avoiding the displacement of the limiting member and the resulting abnormal bending of the bendable connecting portion.

In some implementations of the present disclosure, the adapter assembly further includes a second insulating film, with the second insulating film being clamped between the first insulating film and the movable rotary cover. In this way, the second insulating film can prevent the risk of a short circuit caused by metal chips such as welding slag and rusty slag at the second connecting portion falling into the energy storage device, facilitating the improvement of the yield and safety of the energy storage device. Moreover, the second insulating film can further avoid the problem of short circuit caused by contact between the first connecting portion and the second connecting portion.

In some implementations of the present disclosure, the second connecting portion includes a second welding area, and the movable rotary cover defines a notch at a position corresponding to the second welding area to expose the second insulating film. In this way, the second insulating film can cover the entire second welding area, further avoiding the risk of a short circuit caused by the metal chips such as welding slag and rusty slag at the second connecting portion falling into the energy storage device, and improving the yield and safety of the energy storage device.

In some implementations of the present disclosure, an orthographic projection of the notch on the first insulating film is spaced apart from an orthographic projection of the window on the first insulating film. In this way, the risk of a short circuit caused by contact between the first connecting portion and the second connecting portion is avoided. Moreover, the risk of a short circuit caused by the contact between the metal chips such as welding slag and rusty slag and the first connecting portion or the second connecting portion through the window and the notch is avoided. Furthermore, the occurrence of displacement caused by the movable rotary cover pushing the first insulating film and the second insulating film is avoided.

In some implementations of the present disclosure, the second insulating film includes a first film body attached to the first insulating film and a second film body foldable with respect to and connected to the first film body, with the second film body facing the second connecting portion, so as to better fix the relative positions of the first insulating film and the second insulating film.

In some implementations of the present disclosure, the bendable connecting portion defines a through hole to form, on two opposite sides of the through hole, a first fuse portion and a second fuse portion connected to the first connecting portion and the second connecting portion, and the limiting member shields at least a part of the through hole. In this way, firstly, when the energy storage device is out of control, the first fuse portion and the second fuse portion are fused, so that an open circuit state is formed between the first connecting portion and the second connecting portion, and there is no voltage output, protecting the energy storage device and preventing explosion and fire; and the limiting member can increase the insulation of the first connecting portion and the second connecting portion on two sides of a fuse connecting portion, thereby further increasing the arc extinguishing effect. Secondly, it is ensured that after the displacement of the first insulating film and the second insulating film, the limiting member can still isolate the first connecting portion from the second connecting portion to prevent a contact short circuit. Thirdly, after the fuse connecting portion is fused, the arrangement of the limiting member can avoid the problem of short circuit caused by a further overlapping joint between the first connecting portion and the second connecting portion. Fourthly, the problem of potential safety hazard caused by the metal chips entering the interior of the energy storage device through the through hole is avoided.

In some implementations of the present disclosure, the limiting member is of a plastic structure. In this way, the insulating effect of the limiting member is realized. Moreover, the buffering effect of the limiting member is improved. Furthermore, the production cost is reduced. In addition, the frictional force between the first insulating film and the second insulating film is increased, avoiding the displacement of the first insulating film and the second insulating film.

In a second aspect, an implementation of the present disclosure provides an energy storage device, including a terminal post, a tab, and an adapter assembly as described above, where the first connecting portion of the adapter assembly is electrically connected to the terminal post, and the second connecting portion of the adapter assembly is electrically connected to the tab, so as to prolong the service life of the energy storage device.

In a third aspect, an implementation of the present disclosure provides a power consuming apparatus, including an energy storage device as described above, the energy storage device supplying electric energy to the power consuming apparatus, so as to prolong the service life of the power consuming apparatus.

The basic concepts involved in the implementations of the present disclosure are first briefly described below.

The term "energy storage device" refers to a device that converts its own stored chemical energy into electric energy, that is, a device that converts pre-stored energy into electric energy for external use.

The term "fuel cell" refers to a chemical device that directly converts the chemical energy of fuel into electric energy, also known as an electrochemical generator.

The term "traction battery" refers to a power source that supplies power for a tool, and mostly refers to a storage battery that supplies power for an electric vehicle, an electric train, an electric bicycle, and a golf cart.

The power consuming apparatus in the implementations of the present disclosure includes, but is not limited to, a portable apparatus such as a Bluetooth headset, a mobile phone, a digital device and a tablet computer, and a large-scale apparatus such as an electric motorcycle, an electric vehicle, and an energy storage power station, which will not be limited in the implementations of the present disclosure. The energy storage device supplies electric energy for the power consuming apparatus. The energy storage device includes, but is not limited to, at least one of a traction battery, a fuel cell, a supercapacitor, etc. The traction battery includes, but is not limited to, a lithium-ion traction battery, a metal hydride nickel traction battery, a supercapacitor, etc.

Figure 2:
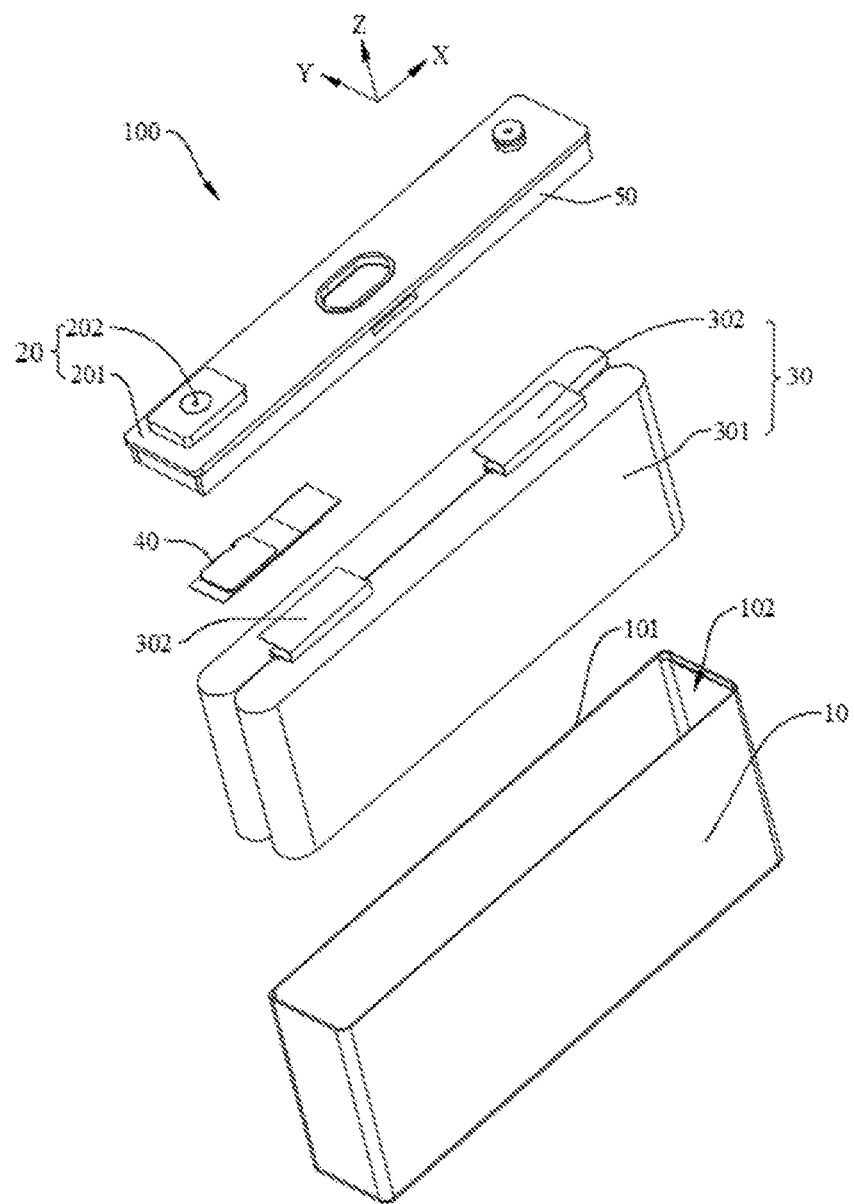
FIG. 2 is an exploded view of the energy storage device in FIG. 1 from a first perspective.
Figure 3:
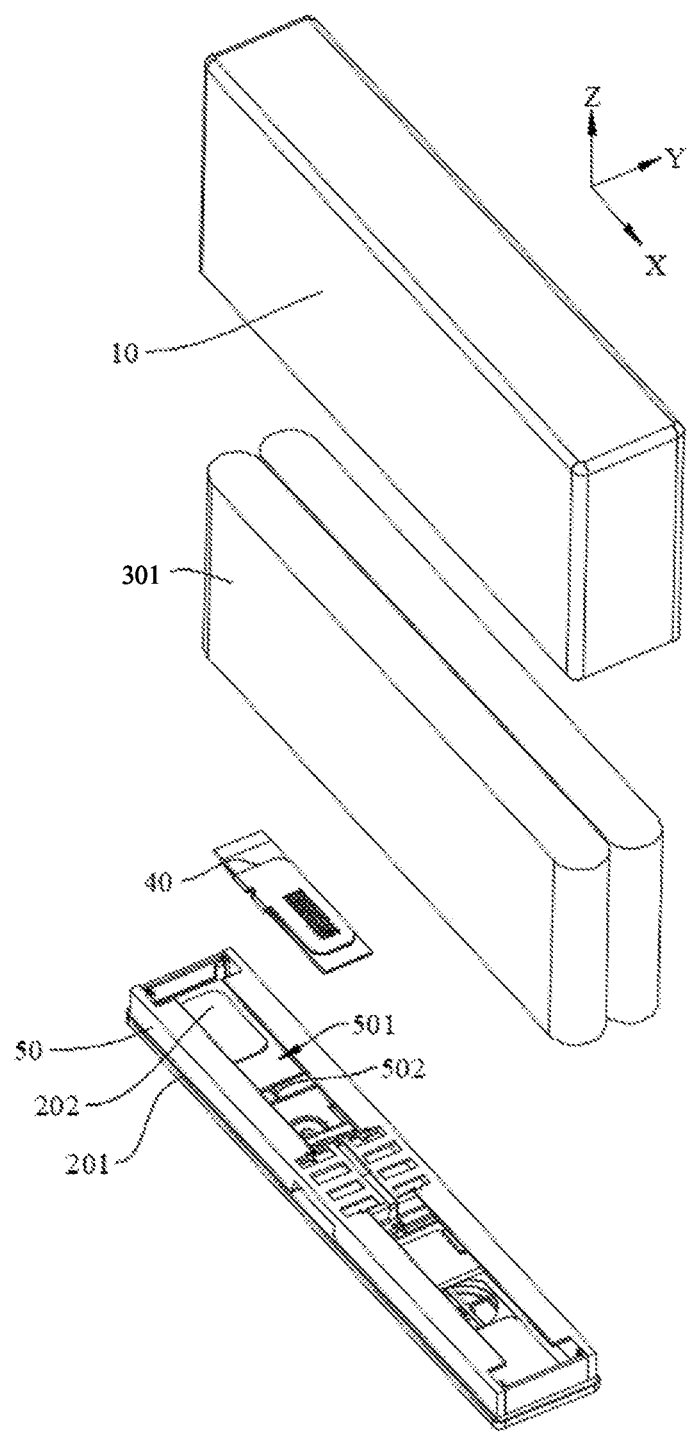
FIG. 3 is an exploded view of the energy storage device in FIG. 2 from a second perspective.

It can be understood that, in order to enable those of ordinary skill in the art to better understand the energy storage device, the energy storage device is described in detail by taking a traction battery as an example. It should be noted that the energy storage device is a traction battery for illustration only, and would not be specifically limited in the present disclosure. For example, the product type of the energy storage device may also be set according to actual requirements. Referring to FIGS. 1 to 3, FIG. 1 shows a schematic structural diagram of an energy storage device 100 provided in an implementation of the present disclosure; FIG. 2 is an exploded view of the energy storage device 100 in FIG. 1 from a first perspective; and FIG. 3 is an exploded view of the energy storage device 100 in FIG. 2 from a second perspective. The energy storage device 100 includes a housing 10, an end cap assembly 20, an electrode assembly 30 and an adapter assembly 40. The electrode assembly 30 and the adapter assembly 40 are arranged in the housing 10, and the housing 10 is sealingly and fixedly connected to the end cap assembly 20 to realize the packaging of the electrode assembly 30 and the adapter assembly 40. Specifically, the housing 10 has an opening 101 and a receiving cavity 102 in communication with the opening 101. The electrode assembly 30 is received in the receiving cavity 102. The receiving cavity 102 is further configured to store an electrolyte solution, so that the electrolyte solution can infiltrate the electrode assembly 30. The end cap assembly 20 includes an end cap 201 and a terminal post 202 arranged on a cap plate, and the electrode assembly 30 includes a battery cell 301 and a tab 302 electrically connected to the battery cell 301. The terminal post 202 is electrically connected to the tab 302 via the adapter assembly 40. One or more battery cells 301 may be included. Illustratively, in this implementation, the electrode assembly 30 includes two battery cells 301 arranged side by side in a width direction of the energy storage device 100. It should be noted that the number of battery cells 301 is only for illustration and does not constitute a specific limitation, and the number of battery cells 301 needs to be designed according to the actual product design.

In some implementations, the energy storage device 100 further includes a lower plastic member 50 connected to the end cap assembly 20. Specifically, the lower plastic member 50 is fixedly connected to the side of the end cap 201 close to the housing 10. The lower plastic member 50 is provided with a limiting groove 501 for positioning the adapter assembly 40. The bottom of the limiting groove 501 is provided with a limiting boss 502 for abutting against the second connecting portion 13, so that the adapter assembly 40 is evenly stressed during assembling, is positioned reliably, and has improved assembly efficiency and accuracy.

It should be noted that the purpose of FIG. 1 is only to schematically describe the arrangement of the housing 10, the end cap assembly 20, the electrode assembly 30, the adapter assembly 40 and the lower plastic member 50, and is not intended to specifically limit the connection position, connection relationship and specific structure of each element. FIG. 1 shows only a schematic structure of an energy storage device 100 according to an implementation of the present disclosure, and does not constitute a specific limitation on the energy storage device 100. In some further implementations of the present disclosure, the energy storage device 100 may include more or fewer components than those shown in FIG. 1, or a combination of some components, or different components. For example, the energy storage device 100 may further include, but not limited to, a temperature sensor, a battery management system, a connecting harness, etc.

Figure 4:
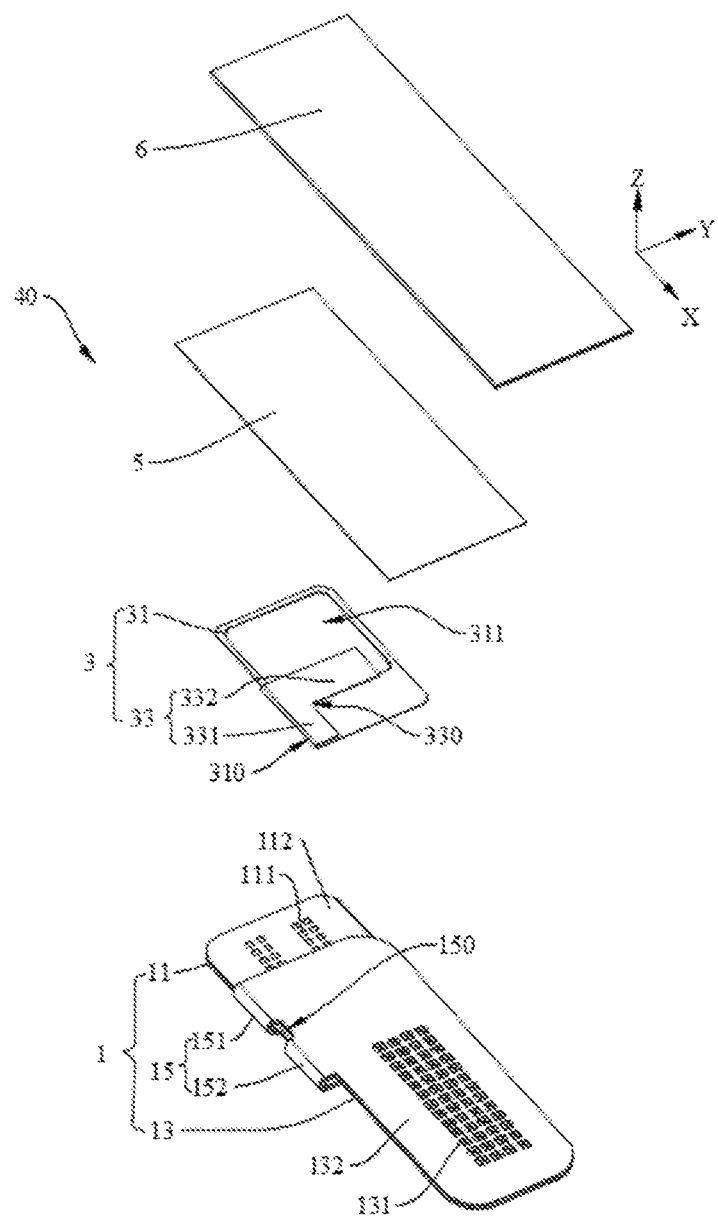
FIG. 4 is an exploded view of an adapter assembly of the energy storage device in FIG. 3 from a first perspective.
Figure 5:
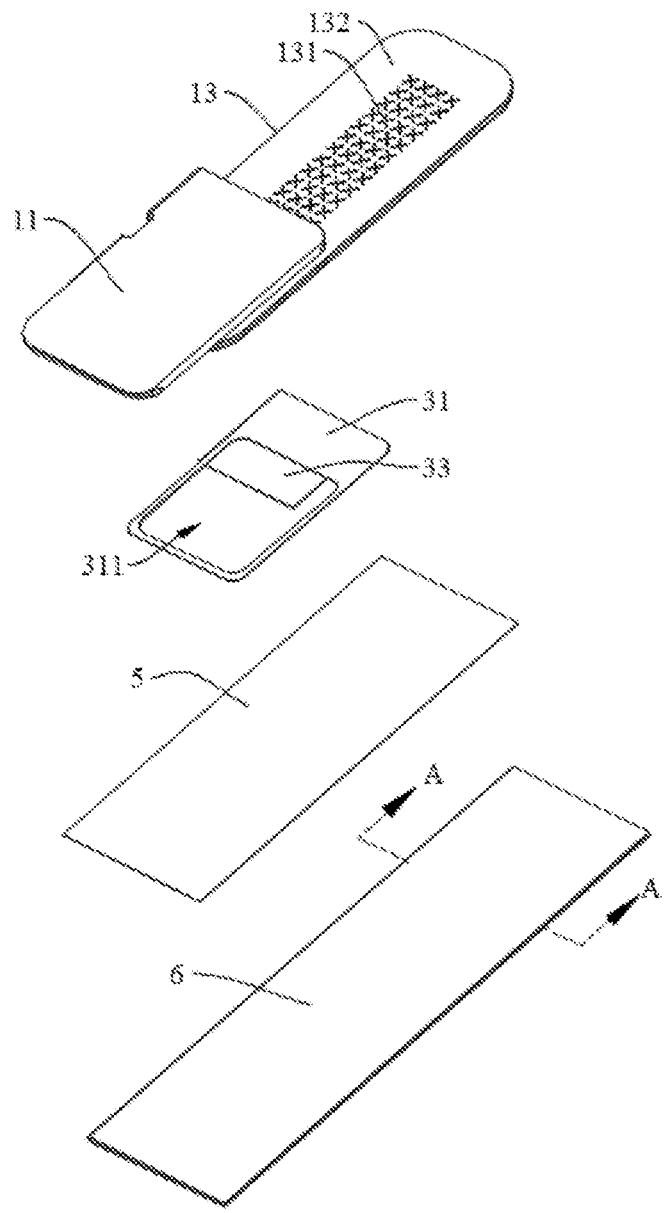
FIG. 5 is an exploded view of the adapter assembly of the energy storage device in FIG. 4 from a second perspective.

Referring to FIGS. 2, 4 and 5, FIG. 4 is an exploded view of the adapter assembly 40 of the energy storage device 100 in FIG. 3 from a first perspective; and FIG. 5 is an exploded view of the adapter assembly 40 of the energy storage device 100 in FIG. 4 from a second perspective. The adapter assembly 40 includes an adapter 1 and a limiting member 3. The adapter 1 includes a first connecting portion 11, a second connecting portion 13, and a bendable connecting portion 15 connected between the first connecting portion 11 and the second connecting portion 13. The first connecting portion 11 is arranged opposite the second connecting portion 13. The limiting member 3 is located between the first connecting portion 11 and the second connecting portion 13 foldable with respect to each other, and is configured to be insulated from the adapter 1. The limiting member 3 has a limiting face 310 configured to abut against the bendable connecting portion 15. The bendable connecting portion 15 is configured to rotate and bend around the limiting face 310.

It can be understood that, illustratively, in this implementation, the adapter 1 may be a positive electrode adapter. The positive electrode adapter is an aluminum foil or an aluminum alloy foil. Since the material of the aluminum foil or the aluminum alloy foil is relatively soft, the positive electrode adapter is prone to breakage after excessive bending. In some implementations, the adapter 1 may also be a negative electrode adapter. The negative electrode adapter is a copper foil or a copper alloy foil, and the copper foil or the copper alloy foil is also prone to breakage after excessive bending. Therefore, the adapter assembly 40 provided in the present disclosure is based on adding a limiting member 3 between the first connecting portion 11 and the second connecting portion 13. Firstly, the limiting member 3 can buffer the bendable connecting portion 15, so that the limiting member 3 can absorb and disperse the stress of the bendable connecting portion 15 during bending, so as to improve the structural stress strength of the bendable connecting portion 15 during the bending, and the problem of breakage of the bendable connecting portion 15 due to excessive stress can thus be effectively avoided, thereby prolonging the service life of the bendable connecting portion 15. Secondly, the bendable connecting portion 15 is configured to rotate and bend around the limiting face 310, so that the limiting face 310 functions to guide the bending of the bendable connecting portion 15, and to support the bendable connecting portion 15 during bending, and the adapter 1 is thus easier to bend. Thirdly, since the limiting member 3 is configured to be insulated from the adapter 1, the problem of short circuit caused by overlapping joint between the first connecting portion 11 and the second connecting portion 13 can be avoided. Fourthly, the adapter 1 is configured to be foldable, so that the space can be saved.

For a clearer description, an X-axis direction is defined as a length direction of the energy storage device 100, a Y-axis direction is defined as a width direction of the energy storage device 100, and a Z-axis direction is defined as a height direction of the energy storage device 100. A length direction of the adapter assembly 40 and a length direction of the adapter 1 are directions parallel to the length direction of the energy storage device 100, a width direction of the adapter assembly 40 and a width direction of the adapter 1 are directions parallel to the width direction of the energy storage device 100, and a height direction of the adapter assembly 40 (i.e. a thickness direction of the adapter assembly 40) and a height direction of the adapter 1 are directions parallel to the height direction of the energy storage device 100. Illustratively, the arrow direction of the Z-axis direction is upward, and the direction opposite to the arrow direction of the Z-axis direction is downward.

Specifically, the first connecting portion 11 of the adapter assembly 40 is electrically connected to the terminal post 202, and the second connecting portion 13 of the adapter assembly 40 is electrically connected to the tab 302, thereby ensuring the connection area between the first connecting portion 11 and the terminal post 202 and the connection area between the second connecting portion 13 and the tab 302, increasing the connection strength between the first connecting portion 11 and the terminal post 202 and the connection strength between the second connecting portion 13 and the tab 302, and preventing the separation of the first connecting portion 11 from the terminal post 202 and the separation of the second connecting portion 13 from the tab 302 during the use of the energy storage device 100. Optionally, in some implementations, the limiting face 310 is an arc-shaped face, so as to avoid the risk of scratching or hitting the adapter 1 due to the irregular limiting face 310; or to avoid the difficult mounting problem caused by the irregular limiting face 310, thereby further realizing the protection of the bendable connecting portion 15. In some other implementations, the shape of the limiting face 310 may also be, but not limited to, wave-shaped, polygonal, etc., which will not be specifically limited in the present disclosure.

Illustratively, in this implementation, the limiting member 3 includes a limiting body 31 and a movable rotary cover 33 rotatably connected to the limiting body 31, the limiting body 31 is configured to abut against the first connecting portion 11, and the movable rotary cover 33 is configured to abut against the second connecting portion 13. The bending range of the bendable connecting portion 15 is limited by the bending range of the movable rotary cover 33 relative to the limiting body 31, so as to avoid the breakage of the bendable connecting portion 15 during the bending, and to ensure that the adapter 1 is easy to bend. Moreover, the movable rotary cover 33 is rotatably connected to the limiting body 31, so as to avoid the recessed deformation of a surface of the limiting member 3 under pressure, so that the limiting member 3 has a good pressure resistance capacity, thereby improving the buffering effect of the limiting member 3 on the bendable connecting portion 15. In some implementations, the limiting member 3 may only include the limiting body 31, that is, the movable rotary cover 33 may be omitted.

Optionally, in some implementations, the first connecting portion 11, the limiting body 31, the movable rotary cover 33 and the second connecting portion 13 are stacked in sequence in the thickness direction of the adapter assembly 40, so that the overall structure of the adapter assembly 40 is more compact, achieving beneficial effects such as saving space, and facilitating the mounting and dismounting of the limiting member 3.

In this implementation, the limiting body 31 is integrally formed with the movable rotary cover 33. The limiting member 3 is configured as a bendable structure. For example, the limiting member 3 is configured as an elastic piece that can be bent and unfolded. In this way, the connection strength between the limiting body 31 and the movable rotary cover 33 is increased, the assembly efficiency between the limiting member 3 and the adapter 1 is improved, and the processing and production process of the limiting member 3 is facilitated. Moreover, the movable rotary cover 33 can weaken the squeezing force of the limiting member 3 from the bendable connecting portion 15, so as to avoid the recessed deformation of a surface of the limiting member 3 under pressure, so that the limiting member 3 has a good pressure resistance capacity, thereby improving the buffering effect of the limiting member 3 on the bendable connecting portion 15. In some implementations, the limiting body 31 and the movable rotary cover 33 may also be rotatably connected together via a rotating shaft, a hinge, etc., which will not be specifically limited in the present disclosure.

In some implementations, the first connecting portion 11 includes a first welding area 111. The terminal post 202 arranged on the end cap 201 is mainly assembled to the first welding area 111 of the first connecting portion 11 by welding or riveting. Welding includes, but is not limited to, resistance spot welding, ultrasonic welding, laser welding and other processes. Illustratively, in this implementation, the first connecting portion 11 is assembled to the terminal post 202 by using a laser welding process. It should be noted that the resistance spot welding, laser welding process and ultrasonic welding process are widely used in the art, and will not be described in detail here. It can be understood that it is likely to generate welding slag during the welding of the adapter 1, and metal chips at the first welding area 111 are likely to fall off from the first connecting portion 11 during movement. When the metal chips fall inside the energy storage device 100, it is likely to cause a short circuit inside the energy storage device 100, affecting the performance and safety of the energy storage device 100.

Optionally, in some implementations, the limiting body 31 defines a window 311 for exposing the first welding area 111. The adapter assembly 40 further includes a first insulating film 5. The first insulating film 5 is arranged at the window 311 and shields the window 311. In this way, the first insulating film 5 can prevent the risk of a short circuit caused by the metal chips such as welding slag and rusty slag at the first connecting portion 11 falling into the energy storage device 100, facilitating the improvement of the yield and safety of the energy storage device 100. Moreover, the first insulating film 5 can further avoid the problem of short circuit caused by contact between the first connecting portion 11 and the second connecting portion 13.

Figure 6:
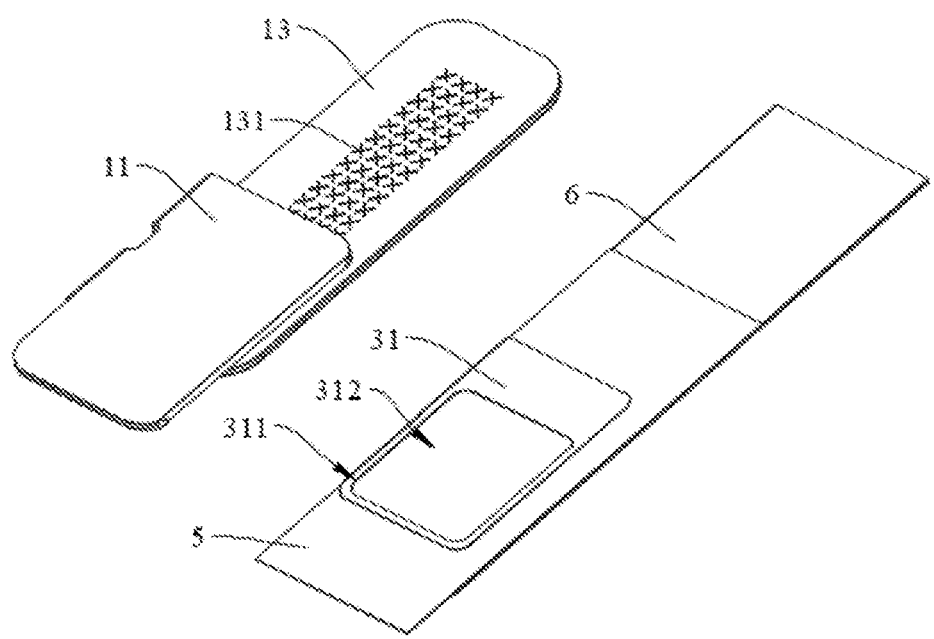
FIG. 6 is a partial exploded view of the adapter assembly of the energy storage device in FIG. 2.

Referring to FIGS. 4, 5 and 6, FIG. 6 is a partial exploded view of the adapter assembly 40 of the energy storage device 100 in FIG. 2. In this implementation, the window 311 has a square shape, that is, edge portions of the limiting body 31 for abutting against the first insulating film 5 are formed around the window 311, increasing the contact area between the limiting body 31 and the first insulating film 5, that is, increasing the frictional force between the limiting body 31 and the first insulating film 5, thereby reducing the risk of the first insulating film 5 falling off or displacing, and achieving a high use safety and prolonged service life. Side walls of the window 311 and the first insulating film 5 enclose a storage tank 312. The storage tank 312 is configured to store the metal chips such as welding slag and rusty slag, so as to avoid scratching the second connecting portion 13 during the movement, and to ensure that the metal chips such as welding slag and rusty slag would not overflow from the first insulating film 5. Such a design saves the use cost for a user, the energy storage device 100 has a high specific energy, the structure of the energy storage device 100 is compact, and the mounting space is saved.

In some implementations, the window 311 may also be C-shaped, U-shaped, etc. The shape of the window 311 may be designed according to the shape of the first welding area 111, which will not be specifically limited in the present disclosure. Optionally, in some implementations, the limiting body 31 of the limiting member 3, the edges and corners of the movable rotary cover 33 and the corners of the window 311 are rounded, so as to prevent the limiting member 3 from damaging the first insulating film 5.

Illustratively, in an implementation, the length of the first insulating film 5 is greater than that of the first welding area 111, and the width of the first insulating film 5 is greater than that of the first welding area 111, so as to ensure that the first insulating film 5 can block the slag such as welding slag and rusty debris at the first welding area 111. Specifically, the first connecting portion 11 further includes a first non-welding area 112 arranged around the outside of the first welding area 111. Optionally, the first insulating film 5 covers the first welding area 111 and the first non-welding area 112, so as to better realize the insulation protection between the first connecting portion 11 and the second connecting portion 13, and ensure that the first insulating film 5 can still shield the first welding area 111 after being displaced by a predetermined distance, to block the slag such as welding slag and rusty debris, improving the safety performance of the energy storage device 100. The length of the first insulating film 5 is equal to that of the first welding area 111, and/or the width of the first insulating film 5 is equal to that of the first welding area 111, thereby saving the production cost. In some implementations, the first insulating film may also only cover the first welding area 111.

Illustratively, the material of the first insulating film 5 includes, but is not limited to, one or a combination of polypropylene (PP), polyphenylene sulfide (PPS), polyethylene terephthalate (PET), polyimide (PI), polystyrene (PS), cast polypropylene film (CPP), polyethylene naphthalate two formicacid glycol ester (PEN), polyvinyl chloride (PVC), polyether-ether-ketone (PEEK), polyethersulfone resin (PES), polyphenylene sulfone resins (PPSM), and polyethylene (PE). In some implementations, the first insulating film 5 is a PET film. The PET film is a glossy plastic film with high-quality physical properties, high rigidity, strength and ductility, and excellent puncture resistance, abrasion resistance, heat resistance and ultra-low temperature resistance, chemical resistance, wear resistance, sealing and fragrance retention. Of course, the first insulating film 5 may instead be made of other materials such as PPS, PE and PVC according to actual requirements.

In this implementation, the number of first insulating films 5 may be selected to a single layer or multiple layers. As an example, the multiple layers of first insulating films of multiple layers are, for example, two layers, three layers, four layers or more. It should be noted that the number of first insulating films 5 is only for illustration and does not constitute a specific limitation. Illustratively, the first insulating film 5 has a thickness of 0.05-0.5 mm. The thickness of the first insulating film 5 needs to be determined according to the actual product design. If the first insulating film 5 is too thin, it may be easily damaged, but if the first insulating film 5 is too thick, it will increase the weight of the energy storage device 100 and reduce the energy density of the energy storage device 100.

The first insulating film 5 is clamped between the limiting body 31 and the movable rotary cover 33, thereby reducing the displacement or detachment of the first insulating film 5 during the movement of the energy storage device 100, and improving the assembly efficiency of the first insulating film 5. Optionally, in some implementations, the limiting body 31 is fixed to the first connecting portion 11 via the first insulating film 5. Specifically, the first insulating film 5 has viscosity, that is, the limiting body 31 is bonded to the first connecting portion 11 via the first insulating film 5, such that the limiting body 31 is clamped between the first insulating film 5 and the first connecting portion 11. In this way, the connection strength between the first insulating film 5 and the first connecting portion 11 is increased to further reduce the displacement or detachment of the first insulating film 5 during the movement of the energy storage device 100. Moreover, the position of the limiting member 3 is defined, so as to ensure that the bendable connecting portion 15 can be rotated and bent around the limiting face 310 of the limiting member 3, and to improve the assembly efficiency of the limiting body 31.

In some implementations, the first insulating film 5 is provided at the first welding area 111 to carry out insulation protection on the first welding area 111 of the first connecting portion 11, and avoid product explosion and other safety accidents caused by a potential hazard of internal short circuit in the energy storage device 100 during the manufacturing and movement. The first insulating film 5 is attached to the first non-welding area 112 of the first connecting portion 11. In some other implementations, the first insulating film 5 is attached to the first welding area 111 of the first connecting portion 11. Alternatively, the first insulating film 5 is attached to the first welding area 111 and the first non-welding area 112 of the first connecting portion 11. Optionally, the first insulating film 5 may also be attached to a side face of the limiting body 31 that is close to the movable rotary cover 33, so as to further enhance the connection strength between the first insulating film 5 and the limiting member 3 and between the first insulating film and the first connecting portion 11, to reduce the displacement or detachment of the first insulating film 5 during the movement of the energy storage device 100. In some other implementations, the first insulating film 5 may not have viscosity, that is, the first insulating film 5 is clamped between the limiting body 31 and the movable rotary cover 33, thereby simplifying the assembly efficiency and saving costs.

In some implementations, the limiting body 31 is fixed to the first connecting portion 11, so as to further increase the connection strength between the limiting member 3 and the adapter 1, to better fix the relative position of the limiting member 3, thereby avoiding the displacement of the limiting member 3 and the resulting abnormal bending of the bendable connecting portion 15 and displacement or detachment of the first insulating film 5. Illustratively, in this implementation, the limiting body 31 and the first connecting portion 11 may be fixedly connected together by means of adhesive bonding, that is, an adhesive layer is provided between the limiting body 31 and the first connecting portion 11, so that the adhesive layer can be further used for buffering the stress of the bendable connecting portion 15, improving the bending efficiency and success rate, and simplifying the overall structure of the adapter assembly 40. In some other implementations, the limiting body 31 and the first connecting portion 11 may also be fixedly connected together by, but not limited to, thermal fusion, binding, mechanical connection, laser welding, ultrasonic welding, etc.

It can be understood that, illustratively, in this implementation, the movable rotary cover 33 is arranged movably relative to the second connecting portion 13, so as to facilitate the assembly and disassembly of the limiting member 3. In some other implementations, the movable rotary cover 33 may also be fixed to the second connecting portion 13. Alternatively, the limiting body 31 may be arranged movably relative to the first connecting portion 11. Optionally, at least one of the movable rotary cover 33 and the limiting body 31 is arranged fixedly relative to the adapter 1, so as to avoid the problem of affecting the bending of the adapter 1 due to the displacement of the limiting member 3.

Illustratively, in this implementation, the adapter assembly 40 further includes a second insulating film 6, with the second insulating film 6 being clamped between the first insulating film 5 and the movable rotary cover 33. In this way, the second insulating film 6 can prevent the risk of a short circuit caused by the metal chips such as welding slag and rusty slag at the second connecting portion 13 falling into the energy storage device 100, facilitating the improvement of the yield and safety of the energy storage device 100. Moreover, the second insulating film 6 can further avoid the problem of short circuit caused by contact between the first connecting portion 11 and the second connecting portion 13.

Optionally, the second connecting portion 13 includes a second welding area 131. The movable rotary cover 33 defines a notch 330 at a position corresponding to the second welding area 131 to expose the second insulating film 6. In this way, the second insulating film 6 can cover the entire second welding area 131, further avoiding the risk of a short circuit caused by the metal chips such as welding slag and rusty slag at the second connecting portion 13 falling into the energy storage device 100, and improving the yield and safety of the energy storage device 100. The notch 330 is defined at the end of the movable rotary cover 33 facing away from the limiting body 31, so as to ensure the connection strength between the movable rotary cover 33 and the limiting body 31 and prevent the movable rotary cover 33 from breaking during rotating.

The second connecting portion 13 further includes a second non-welding area 132 arranged around the outside of the second welding area 131. Optionally, the second insulating film 6 covers the second welding area 131 and the second non-welding area 132, so as to better realize the insulation protection between the first connecting portion 11 and the second connecting portion 13, and ensure that the second insulating film 6 can still shield the second welding area 131 after being displaced by a predetermined distance, to block the slag such as welding slag and rusty debris, improving the safety performance of the energy storage device 100. The length of the second insulating film 6 is equal to that of the second welding area 131, and/or the width of the second insulating film 6 is equal to that of the second welding area 131, thereby saving the production cost. In some implementations, the second insulating film 6 may also only cover the second welding area 131.

Figure 7:
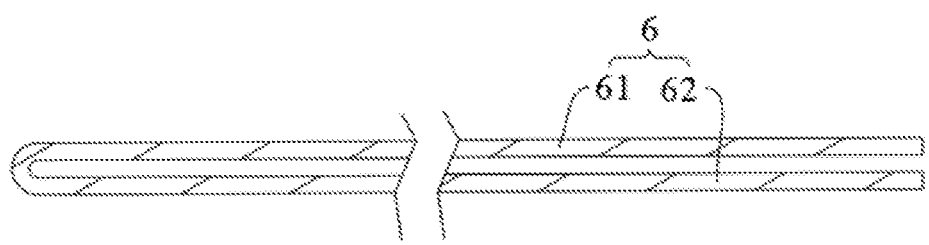
FIG. 7 is a cross-sectional view of a second insulating film of the adapter assembly in FIG. 5 along line A-A.

Referring to FIGS. 5 and 7, FIG. 7 is a cross-sectional view of the second insulating film 6 of the adapter assembly 40 in FIG. 5 along line A-A. In some implementations, the second insulating film 6 includes a first film body 61 attached to a first insulating film 5 and a second film body 62 foldable with respect to and connected to the first film body 61, with the second film body 62 facing the second connecting portion 13, so as to better fix the relative positions of the first insulating film 5 and the second insulating film 6.

Optionally, the first film body 61 may be fixed to the first insulating film 5 by means of bonding. The second film body 62 may also be fixed to the movable rotary cover 33 and/or the second connecting portion 13 by means of bonding, so as to further avoid displacement of the first insulating film 5 and the second insulating film 6. In some further implementations, the second insulating film 6 may also be configured as a single-layer film. In some other implementations, the second insulating film 6 may be omitted, the first insulating film 5 covers both the second welding area 131 and the first welding area 111, and the first insulating film 5 is configured as a double-layer film, with one layer of insulating film covering the first welding area 111, and the other layer of insulating film covering the second welding area 131.

Figure 8:
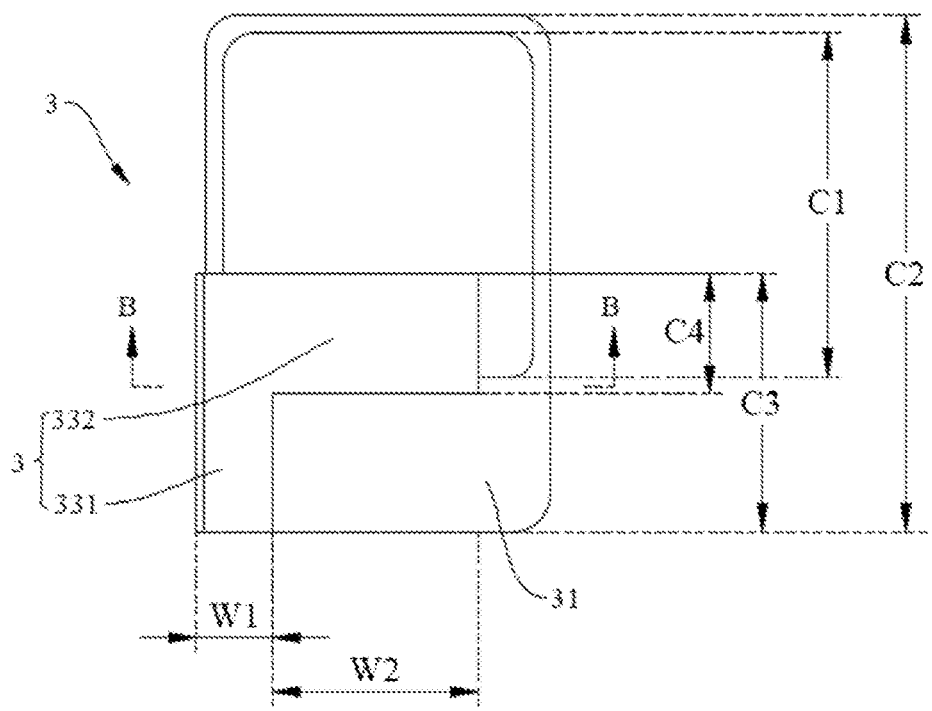
FIG. 8 is an enlarged view of a limiting member of the adapter assembly in FIG. 4.
Figure 9:
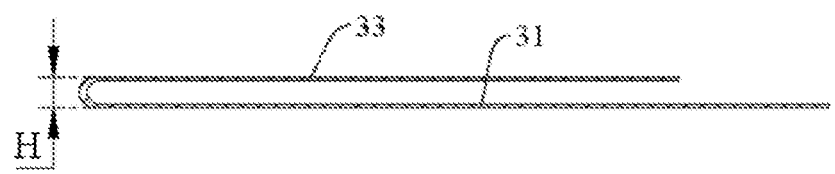
FIG. 9 is a cross-sectional view of the limiting member of the adapter assembly in FIG. 8 along line B-B.

Referring to FIGS. 8 and 9, FIG. 8 is an enlarged view of the limiting member 3 of the adapter assembly 40 in FIG. 4; and FIG. 9 is a cross-sectional view of the limiting member 3 of the adapter assembly 40 in FIG. 8 along line B-B. In some implementations, the limiting member 3 has a thickness H of 0.03 mm-5 mm in the thickness direction of the adapter assembly 40, that is, the overall thickness of the limiting member 3 is 0.03 mm-5 mm. In this way, stress fatigue or even breakage of the bendable connecting portion 15 of the adapter 1 is avoided during the bending, and the reliability of use of the adapter 1 is improved. Moreover, the space occupied by the limiting member 3 is reduced in the thickness direction of the adapter assembly 40, effectively reducing the thickness of the adapter assembly 40, and further adapting to the market demand for the miniaturization of the adapter assembly 40.

It can be understood that the radius of curvature of the bendable connecting portion 15 increases as the thickness H of the limiting member 3 in the thickness direction of the adapter assembly 40 increases. If the thickness H of the limiting member 3 in the thickness direction of the adapter assembly 40 is too small, the radius of curvature of the bendable connecting portion 15 is small, leading to the problem of breakage of the bendable connecting portion 15 during the bending. If the thickness H of the limiting member 3 in the thickness direction of the adapter assembly 40 is too large, the radius of curvature of the bendable connecting portion 15 is large, increasing the weight of the energy storage device 100, increasing the occupation of the internal space of the energy storage device 100 by the limiting member 3, and reducing the energy density of the energy storage device 100. Optionally, the thickness H of the limiting member 3 in the thickness direction of the adapter assembly 40 is 2 mm, so as to better balance the overall thickness of the limiting member 3 and the radius of curvature of the bendable connecting portion 15. For example, in some implementations, the thickness H of the limiting member 3 in the thickness direction of the adapter assembly 40 is 0.3 mm, 0.05 mm, 0.07 mm, 1 mm, 1.5 mm, 2 mm, 2.5 mm, 3 mm, 3.5 mm, 4 mm, 4.5 mm, 5 mm, and so on. It should be noted that the dimension of the thickness H of the limiting member 3 is only for illustration and does not constitute a specific limitation, and the thickness H of the limiting member 3 needs to be designed according to the actual product design.

A ratio of a length C1 of the window 311 to a length C2 of the limiting body 31 is 0.2-0.5, so as to prevent the limiting member 3 from being misaligned with the first connecting portion 11 due to the displacement caused by vibration during transportation of the energy storage device 100, thereby effectively blocking the welding slag of the first connecting portion 11 and improving the safety of the energy storage device 100. The ratio of the length C1 of the window 311 to the length C2 of the limiting body 31 is 0.2, 0.25, 0.3, 0.35, 0.4, 0.45, 0.5, and so on. Illustratively, in this implementation, the length C1 of the window 311 is 8 mm, the length C2 of the limiting body 31 is 26 mm, and the ratio of the length C1 of the window 311 to the length C2 of the limiting body 31 is 0.3. It should be noted that the dimensions of the length C1 of the window 311 and the length C2 of the limiting body 31 are only for illustration and do not constitute a specific limitation, and the length C1 of the window 311 and the length C2 of the limiting body 31 need to be designed according to the actual product design.

Illustratively, in this implementation, the movable rotary cover 33 may have an L-shaped structure as a whole. Specifically, the movable rotary cover 33 includes a fixing portion 331 connected to the limiting body 31, and an extension portion 332 connected to the side of the fixing portion 331 facing away from the limiting body 31. A length C3 of the fixing portion 331 is equal to or greater than a length C4 of the extension portion 332, so as to ensure the connection strength between the fixing portion 331 and the limiting body 31. In some implementations, the movable rotary cover 33 may also have a C-shaped structure or a U-shaped structure as a whole, so as to further increase the retaining area between the movable rotary cover 33 and the second insulating film 6, thereby reducing the displacement or detachment of the first insulating film 5 during the movement of the energy storage device 100. In some implementations, the corners of the notch 330 are rounded, so as to prevent the limiting member 3 from damaging the second insulating film 6.

It can be understood that in order to take into account the connection strength between the fixing portion 331 and the extension portion 332 and the connection strength between the fixing portion and the limiting body 31, the retaining force of the limiting member 3 and the exposed area of the second insulating film 6 at the notch 330, the fixing portion 331 has a width W1 of approximately 2 mm-6 mm, and the extension portion 332 has a width W2 of 5 mm-10 mm. For example, in some implementations, the width W1 of the fixing portion 331 is 2 mm, 3 mm, 4 mm, 5 mm, 6 mm, and so on, and the width W2 of the extension portion 332 is 5 mm, 6 mm, 7 mm, 8 mm, 9 mm, 10 mm, and so on. It should be noted that the dimensions of the width W1 of the fixing portion 331 and the width W2 of the extension portion 332 are only for illustration and do not constitute a specific limitation, and the width W1 of the fixing portion 331 and the width W2 of the extension portion 332 need to be designed according to the actual product design.

It should be noted that the material of the first insulating film 5 is applicable to the material of the second insulating film 6, and reference is made to the description of the above implementations for specific details, which will not be repeated here. The material of the second insulating film 6 may be different from that of the first insulating film 5; or may be the same as that of the first insulating film 5. Optionally, the color of the first insulating film 5 is different from the color of the second insulating film 6, so as to facilitate identification, improving the assembly efficiency and accuracy, and facilitating the determination of whether the first insulating film 5 and the second insulating film 6 are missing, displaced, detached, etc. during machine inspection or manual inspection. Illustratively, in this implementation, the first insulating film 5 is a blue insulating film, and the second insulating film 6 is a green insulating film. In some implementations, the colors of the first insulating film 5 and the second insulating film 6 may also be the same. Alternatively, the colors of the first insulating film 5 and the second insulating film 6 are other colors, which will not be specifically limited in the present disclosure.

Optionally, in some implementations, at least one of the first connecting portion 11 and the second connecting portion 13 is provided with an anchor member for anchoring the first insulating film 5 and the second insulating film 6, thereby further avoiding the displacement or detachment of the first insulating film 5 and the second insulating film 6. For example, the anchor member may be configured as a hook structure or a protrusion structure provided on the first connecting portion 11 and the second connecting portion 13, and the first insulating film 5 and the second insulating film 6 are each provided with a snap hole for cooperating with the hook structure or the protrusion structure.

An orthographic projection of the notch 330 on the first insulating film 5 is spaced apart from an orthographic projection of the window 311 on the first insulating film 5, that is, the extension portion 332 of the movable rotary cover 33 and the limiting body 31 stop against each other. In this way, the risk of a short circuit caused by contact between the first connecting portion 11 and the second connecting portion 13 is avoided. Moreover; the risk of a short circuit caused by the contact between the slag such as welding slag and rusty debris and the first connecting portion 11 or the second connecting portion 13 through the window 311 and the notch 330 is avoided. Furthermore, the occurrence of displacement caused by the movable rotary cover 33 pushing the first insulating film 5 and the second insulating film 6 is avoided.

The limiting member 3 is arranged at a position corresponding to the bendable connecting portion 15, so as to ensure that the bendable connecting portion 15 can be bent smoothly, improving the mass production yield of the product. Optionally, the limiting member 3 is configured to abut against the bendable connecting portion 15, so as to ensure that the bendable connecting portion 15 can be rotated and bent around the limiting member 3. In some implementations, the limiting member 3 is spaced apart from the bendable connecting portion 15 by a predetermined distance, so as to provide a space for the deformation of the bendable connecting portion 15. The predetermined distance is approximately 1 mm-3 mm, so as to ensure that the bendable connecting portion 15 can be rotated and bent around the limiting member 3.

In some implementations, the limiting member 3 is arranged in an area where the first connecting portion 11 and the second connecting portion 13 overlap, so as to ensure that the first connecting portion 11 and the second connecting portion 13 can drive the limiting member 3 to press the first insulating film 5 and the second insulating film 6, thereby avoiding the problem of displacement of the first insulating film 5 and the second insulating film 6.

Illustratively, in this implementation, the limiting member 3 is of a plastic structure. The plastic structure is, for example, but not limited to, PET sheet, PE sheet, PS sheet and other sheets. In this way, the insulating effect of the limiting member 3 is realized. Moreover, the buffering effect of the limiting member 3 is improved. Furthermore, the production cost is reduced. In addition, the frictional force between the first insulating film 5 and the second insulating film 6 is increased, avoiding the displacement of the first insulating film 5 and the second insulating film 6. In some implementations, the limiting member 3 may also be of other structures having an insulating effect, such as, but not limited to, asbestos or mica.

Optionally, the limiting member 3 is configured as a sheet-like structure, so as to facilitate the rotating and folding of the movable rotary cover 33 with respect to the limiting body 31, and reduce the space occupied by the limiting member 3 in the adapter assembly 40, thereby saving the production cost. Moreover, it is ensured that the movable rotary cover 33 has a flat surface after being folded with respect to the limiting body 31, so as to better press the first insulating film 5 and the second insulating film 6.

In this implementation, the bendable connecting portion 15 defines a through hole 150 to form, on two opposite sides of the through hole 150, a first fuse portion 151 and a second fuse portion 152 connected to the first connecting portion 11 and the second connecting portion 13, and the limiting member 3 shields at least a part of the through hole 150. In this way, firstly, when the energy storage device 100 is out of control, the first fuse portion 151 and the second fuse portion 152 are fused, so that an open circuit state is formed between the first connecting portion 11 and the second connecting portion 13, and there is no voltage output, protecting the energy storage device 100 and preventing explosion and fire; and the limiting member 3 can increase the insulation of the first connecting portion 11 and the second connecting portion 13 on two sides of the first fuse portion 151 and the second fuse portion 152, thereby further increasing the arc extinguishing effect. Secondly, it is ensured that after the displacement of the first insulating film 5 and the second insulating film 6, the limiting member 3 can still isolate the first connecting portion 11 from the second connecting portion 13 to prevent a contact short circuit. Thirdly, after the first fuse portion 151 and the second fuse portion 152 are fused, the arrangement of the limiting member 3 can avoid the problem of short circuit caused by a further overlapping joint between the first connecting portion 11 and the second connecting portion 13. Fourthly, the problem of potential safety hazard caused by the metal chips entering the interior of the energy storage device 100 through the through hole 150 is avoided.

In this implementation, the through hole 150 is a right-angled quadrilateral hole, such as a square hole or a rectangular hole. Optionally, illustratively, in this implementation, the rectangular hole is a rectangular hole with an ellipse. In some other implementations, the through hole 150 may also be a diamond hole, a rectangular hole, a polygonal hole, an elliptic hole, a waist hole, a circular hole, etc., which will not be specifically limited in the present disclosure.

Referring to FIGS. 2, 4-5 and 10, FIG. 10 is a schematic view of the adapter 1 of the adapter assembly 40 in FIG. 4 in an unfolded state. When the adapter 1 is in the unfolded state, the through hole 150 has a first linear section 1501, a first corner section 1502, a second corner section 1503 and a second linear section 1504. The first linear section 1501 is connected to the first corner section 1502 and adjacent to the first fuse portion 151, the second linear section 1504 is connected to the second corner section 1503 and adjacent to the second fuse portion 152, and the first corner section 1502 and the second corner section 1503 are rounded, so as to avoid the problem of damage to the tab 302 caused by the adapter 1. In some implementations, the edges and corners of the first connecting portion 11, the second connecting portion 13 and the bendable connecting portion 15 are all rounded, so as to further avoid the problem of damage to the tab 302 caused by the adapter 1.

Figure 10:
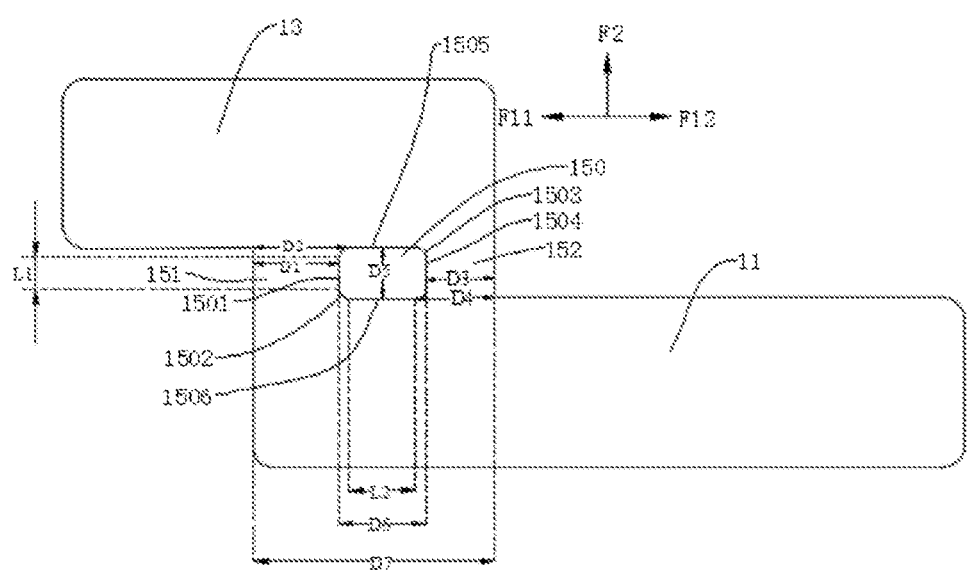
FIG. 10 is a schematic view of an adapter of the adapter assembly in FIG. 4 in an unfolded state.

It should be noted that, for the convenience of describing the technical solution of the present disclosure, referring to FIG. 10, the unfolded state of the adapter 1 refers to a state in which the bendable connecting portion 15 of the adapter 1 is not bent. In this case, the first connecting portion 11, the second connecting portion 13 and the bendable connecting portion 15 are arranged coplanarly. The unfolded state of the adapter 1 is only for describing the accuracy of the through hole 150, and is not the product use state of the energy storage device 100. In the use state, the bendable connecting portion 15 of the adapter 1 is bent, and the first connecting portion 11 and the second connecting portion 13 are arranged opposite each other.

The distance between the first linear section 1501 and the end of the first fuse portion 151 away from the first linear section 1501 is a first distance D1, and the distance between the end of the first corner section 1502 away from the first linear section 1501 and the end of the first fuse portion 151 away from the first corner section 1502 is a second distance D2, where the first distance D1 is less than the second distance D2. The distance between the second linear section 1504 and the end of the second fuse portion 152 away from the second linear section 1504 is a third distance D3, and the distance between the end of the second corner section 1503 away from the second linear section 1504 and the end of the second fuse portion 152 away from the second corner section 1503 is a fourth distance D4, where the third distance D3 is less than the fourth distance D4.

According to the adapter assembly 40 provided in the implementations of the present disclosure, firstly, since the bendable connecting portion 15 is provided with the through hole 150, huge current generated by the energy storage device 100 when it is out of control can act on the first fuse portion 151 and the second fuse portion 152, so as to fuse the first fuse portion 151 and the second fuse portion 152 to disconnect the circuit, improving the use safety and prolonging the service life. Secondly, the first corner section 1502 and the second corner section 1503 of the through hole 150 are both rounded, so as to prevent the adapter 1 from scratching the tab 302, improving the production yield. Thirdly, by setting the distance between the first linear section 1501 and the end of the first fuse portion 151 away from the first linear section 1501 to be less than the distance between the end of the first corner section 1502 away from the first linear section 1501 and the end of the first fuse portion 151 away from the first corner section 1502; and the distance between the second linear section 1504 and the end of the second fuse portion 152 away from the second linear section 1504 to be less than the distance between the end of the second corner section 1503 away from the second linear section 1504 and the end of the second fuse portion 152 away from the second corner section 1503, the fusing position of the adapter 1 is closer to a mechanical fatigue area of the bendable connecting portion 15, and the fusing effect is thus easier to form, improving the safety of the energy storage device 100.

Optionally, a fusing direction F11 of the first fuse portion 151 and a fusing direction F12 of the second fuse portion 152 are perpendicular to a bending direction F2 of the bendable connecting portion 15, so as to ensure that the fusing of the first fuse portion 151 and the second fuse portion 152 is easier to form and to facilitate the bending of the adapter 1. It should be noted that the fusing direction F11 of the first fuse portion 151 and the fusing direction F12 of the second fuse portion 152 refer to the direction perpendicular to the current direction of the adapter 1, the fusing direction F11 of the first fuse portion 151 refers to the direction from the first linear section 1501 to the end of the first fuse portion 151 away from the first linear section 1501, and the fusing direction F12 of the second fuse portion 152 refers to the direction from the second linear section 1504 to the end of the second fuse portion 152 away from the second linear section 1504. The current direction of the adapter 1 is parallel to the bending direction F2 of the bendable connecting portion 15.

The ratio of the first distance D1 to the second distance D2 is 0.7-0.95, and the ratio of the third distance D3 to the fourth distance D4 is 0.7-0.95, so as to ensure the fusing reliability of the first fuse portion 151 and the second fuse portion 152, while ensuring that the adapter 1 has the characteristics of high strength and not easy to break. For example, the ratio of the first distance D1 to the second distance D2 and the ratio of the third distance D3 to the fourth distance D4 are 0.7, 0.73, 0.75, 0.77, 0.8, 0.85, 0.88, 0.9, or 0.95, and so on. Illustratively, in this implementation, the first distance D1 is 7 mm, the second distance D2 is 8 mm, and the ratio of the first distance D1 to the second distance D2 is 0.88.

Two first corner sections 1502 and two second corner sections 1503 are included, the two first corner sections 1502 are connected to two opposite ends of the first linear section 1501, and the two second corner sections 1503 are connected to two opposite ends of the second linear section 1504. The through hole 150 further includes a third linear section 1505 and a fourth linear section 1506 each connected to the first corner section 1502 and the second corner section 1503, and the first linear section 1501, the two first corner sections 1502, the two second corner sections 1503, the second linear section 1504, the third linear section 1505 and the fourth linear section 1506 enclose the through hole 150. Therefore, a punching die made for such a manufacturing has a simple structure, and it is easier to open and close the die. At the same time, the bending length required for the bending position of the bendable connecting portion 15 is reduced by means of the through hole 150, which is more conducive to bending and forming.

The lengths of the first linear section 1501 and the second linear section 1504 are equal and are the first length L1, the distance between the third linear section 1505 and the fourth linear section 1506 is a fifth distance D5, and the ratio of the first length L1 to the fifth distance D5 is 3/7-9/10, so as to ensure that the bendable mechanical fatigue zone of the bendable connecting portion 15 is highly coincident with the positions formed by the fusing of the first fuse portion 151 and the second fuse portion 152, and then the fusing of the first fuse portion 151 and the second fuse portion 152 occurs more easily. For example, the ratio of the first length L1 to the fifth distance D5 may be, but not limited to, 0.4, 0.5, 0.7, 0.8 or 0.9, and so on.

In some implementations, the lengths of the third linear section 1505 and the fourth linear section 1506 are equal and are the second length L2, the distance between the first linear section 1501 and the second linear section 1504 is a sixth distance D6, and the ratio of the second length L2 to the sixth distance D6 is 0.4-0.9, so as to ensure the fusing reliability of the first fuse portion 151 and the second fuse portion 152, while ensuring that the adapter 1 has the characteristics of high strength and not easy to break. For example, the ratio of the second length L2 to the sixth distance D6 may be, but not limited to, 0.4, 0.6, 0.7, 0.8 or 0.9, and so on.

The radii of the rounded corners of the first corner section 1502 and the second corner section 1503 are both 0.5 mm-1.5 mm, so as to avoid the problem of breakage of the first fuse portion 151 and the second fuse portion 152 during the bending. For example, in some implementations, the radii of the rounded corners of the first corner section 1502 and the second corner section 1503 are 0.5 mm, 1.0 mm, 1.5 mm, and so on. It should be noted that the radii of the rounded corners of the first corner section 1502 and the second corner section 1503 are only for illustration and does not constitute a specific limitation, and the radii of the rounded corners of the first corner section 1502 and the second corner section 1503 need to be designed according to the actual product design.

In some implementations, the distance between the end of the first fuse portion 151 away from the first linear section 1501 and the end of the second fuse portion 152 away from the second linear section 1504 is a seventh distance D7, and the ratio of the sixth distance D6 to the seventh distance D7 is 0.15-0.25, so as to ensure that the fusing of the first fuse portion 151 and the second fuse portion 152 occurs more easily, while avoiding stress fatigue or even breakage of the first fuse portion 151 and the second fuse portion 152 of the adapter 1 during the bending, improving the reliability of use of the adapter 1. For example, the ratio of the sixth distance D6 to the seventh distance D7 may be, but not limited to, 0.15, 0.2 or 0.25, and so on. Illustratively, in this implementation, the sixth distance D6 is 3 mm, and the seventh distance D7 is 18 mm. The ratio of the sixth distance D6 to the seventh distance D7 is 0.17.

In some implementations, the sixth distance D6 of the through hole 150 gradually decreases from the middle of the through hole 150 toward the two sides in the current direction of the adapter 1 (that is, the direction from the third linear section 1505 to the fourth linear section 1506), so as to ensure that the first fuse portion 151 and the second fuse portion 152 can be fused in the middle of the through hole 150, while ensuring the connection strength between two side edges of the first fuse portion 151 and the second fuse portion 152 and the first connecting portion 11 and the second connecting portion 13, further avoiding the breakage of the adapter 1 during the rotating and bending process.

Optionally, in this implementation, the first connecting portion 11, the limiting member 3 and the second connecting portion 13 are stacked in the thickness direction of the adapter 1. In this way, the overall structure of the adapter 1 is made more compact and saves space. Moreover, the first connecting portion 11 and the second connecting portion 13 are spaced apart by the limiting member 3 in the thickness direction of the adapter 1, so as to avoid the problem of short circuit between the first connecting portion 11 and the second connecting portion 13, and the limiting member 3 provides a buffering effect between the first connecting portion 11 and the second connecting portion 13, and enhances the structural strength of the bendable connecting portion 15, thereby avoiding the problem of wrinkling or breakage of the bendable connecting portion 15 after being bent.

The first connecting portion 11 includes a first welding area 111, and the second connecting portion 13 includes a second welding area 131. Orthographic projections of the first welding area 111 and the second welding area 131 on the first connecting portion 11 are spaced apart from each other, thereby further avoiding the risk of a short circuit caused by contact between the first connecting portion 11 and the second connecting portion 13. In some implementations, the orthographic projections of the first welding area 111 and the second welding area 131 on the first connecting portion 11 are arranged adjacent to each other or at least partially overlap with each other, shortening the length of the adapter 1, thereby saving the space and lightening the weight, reducing the material consumption of the conductive connecting member, and save the cost.

The bendable connecting portion 15 includes, but is not limited to, a C-shaped structure, a U-shaped structure, a V-shaped structure or a wave-shaped structure, so as to ensure that the first fuse portion 151 and the second fuse portion 152 can be bent smoothly, improving the mass production yield of the product. Illustratively, in this implementation, the first fuse portion 151 and the second fuse portion 152 are configured as a C-shaped structure, thereby reducing local bending of the first fuse portion 151 and the second fuse portion 152 and reducing bending fatigue, preventing the breakage of the first fuse portion 151 and the second fuse portion 152, and reducing the space occupied by the bent first fuse portion 151 and second fuse portion 152 in the width direction of the adapter 1.

Figure 11:
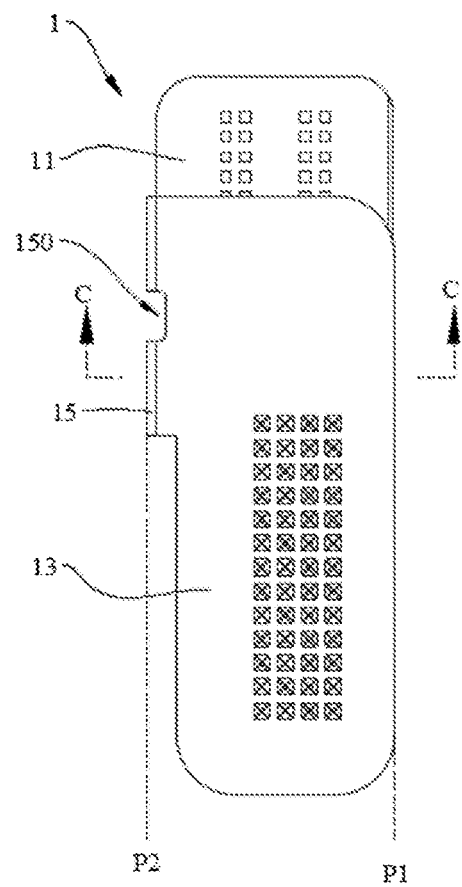
FIG. 11 is a top view of the adapter of the adapter assembly in FIG. 2.
Figure 12:
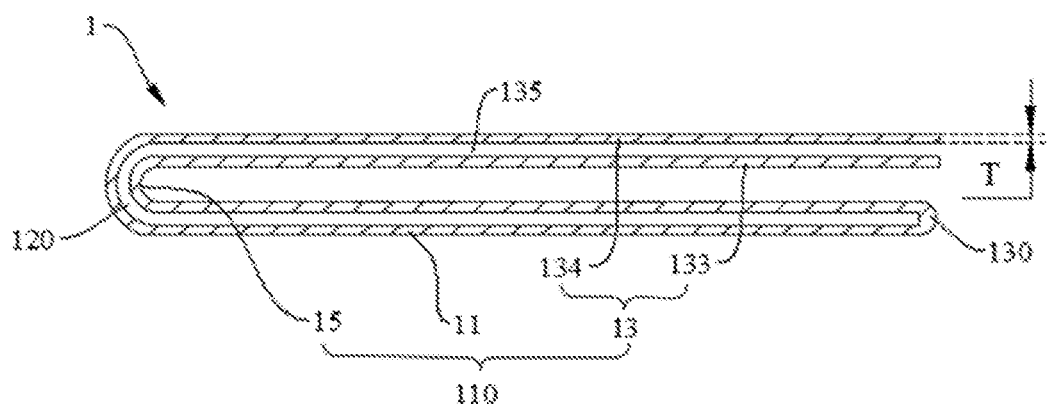
FIG. 12 is a cross-sectional view of the adapter of the adapter assembly in FIG. 11 along line C-C.

Referring to FIGS. 11 to 12, FIG. 11 is a top view of the adapter 1 of the adapter assembly 40 in FIG. 2; and FIG. 12 is a cross-sectional view of the adapter 1 of the adapter assembly 40 in FIG. 11 along line C-C. The adapter 1 is folded in half along a first half-folding axis P1 to form two layers of adapter main bodies 110, and a gap 120 is formed between the two layers of adapter main bodies 110. In this way, the breakage of the adapter 1 at the first half-folding axis P1 is avoided. Moreover, the gap 120 may be used as a passage for allowing the tab 302 to be inserted, and may provide a stress release space for the adapter main bodies 110 to bend again, so as to improve the breakage resistance of the adapter 1. It can be understood that if the gap 120 is too large, it is not conducive to folding the two layers of adapter main body 110 in half; and if the gap 120 is too small, the adapter 1 is likely to break when it is bent along the first half-folding axis P1, and it is not conducive to the mounting of the tab 302 and it is likely to damage the tab 302. Optionally, the gap 120 is approximately 0.3 mm-3 mm, so as to ensure smooth half-folding of the two layers of adapter main bodies 110, and to facilitate the mounting of the tab 302 and protect the tab 302 from damage. For example, in some implementations, the gap 120 is 0.3 mm, 0.5 mm, 0.7 mm, 1 mm, 1.5 mm, 2 mm, 2.5 mm, 3 mm, and so on. It should be noted that the size of the gap 120 is only for illustration and does not constitute a specific limitation, and the gap 120 needs to be designed according to the actual product design.

An arc-shaped structure 130 of the adapter 1 is formed at the first half-folding axis P1, so as to further avoid the problem of breakage of the adapter 1 at the first half-folding axis P1, and to facilitate the bending process and improve the assembly efficiency of the tab 302. The adapter 1 is folded in half along the first half-folding axis P1 by 180 degrees, so as to ensure that surfaces of the adapter main bodies 110 are flat and are in the form of a stacked structure, thereby ensuring that the two layers of adapter main bodies 110 are easier to bend, and can absorb and disperse the stress during bending. Moreover, the adapter 1 is configured to be foldable, so that the space can be saved and the overall thickness of the adapter 1 can be increased.

The two layers of adapter main bodies 110 are folded in half along a second half-folding axis P2 to form the first connecting portion 11, the second connecting portion 13 and the bendable connecting portion 15. The first half-folding axis P1 is parallel to the second half-folding axis P2. In this way, firstly, the two layers of adapter main bodies 110 serve as a thickened anti-bending layers, which can improve the structural strength of the first fuse portion 151 and the second fuse portion 152, and reduce the damage to a wire caused by an excessive bending angle. Secondly, problems such as abnormal bending and large space occupation caused by the intersection of the first half-folding axis P1 and the second half-folding axis P2 are avoided, facilitating the processing and reducing the production scrap rate. Thirdly, the adapter 1 as a whole is folded in half along the first half-folding axis P1 and then bent along the second half-folding axis P2, facilitating the bending process, realizing the standardization of the bending process and improving the processing accuracy. The two layers of adapter main bodies 110 are folded in half along the second half-folding axis P2 by 180 degrees, so as to ensure that the surfaces of the first connecting portion 11 and the second connecting portion 13 are flat, facilitating the respective welding to the terminal post 202 and the tab 302, thereby improving the welding quality and saving the space.

The gap 120 includes an insertion space 135 for allowing the tab 302 to be inserted. The adapter main bodies 110 of the second connecting portion 13 include a first connecting plate 133 and a second connecting plate 134, and the insertion space 135 is formed between the first connecting plate 133 and the second connecting plate 134, thereby enabling the second connecting portion 13 to enclose the tab 302, so as to prevent the tab 302 from being damaged and improve the stability of the tab 302. After the tab 302 is inserted into the insertion space 135 formed between the first connecting plate 133 and the second connecting plate 134, an electrical connection between the tab 302 and the second connecting portion 13 is realized by welding, thereby improving the stability and reliability of the connection between the tab 302 and the second connecting portion 13.

It can be understood that punching is a stamping process that uses a punching die to separate part of a material of a workpiece from the other part of the material. The adapter 1 is generally formed by punching a sheet-like plate, that is, the workpiece includes a punched part to be punched out and the adapter 1 left after punching. The adapter 1 will have burrs formed at edges of the adapter 1 in the punching process. It should be noted that the orientation of the burrs is the same as the punching direction of the adapter 1. Illustratively, in this implementation, the punching direction of the adapter 1 is approximately perpendicular to the extension plane in which the workpiece lies, that is, the punched section of the workpiece is perpendicular to the extension plane in which the workpiece lies. Optionally, the first connecting plate 133 is closer to the first connecting portion 11 than the second connecting plate 134, the second connecting plate 134 is farther away from the first connecting portion 11 than the first connecting plate 133, and the punching direction of the first connecting plate 133 is directed to the first connecting portion 11 and is opposite to that of the second connecting plate 134, so as to avoid the risk of the tab 302 being broken due to the burrs on the punched edges scratching the tab 302. Specifically, the punching direction of the first connecting plate 133 faces upward, and the punching direction of the second connecting plate 134 faces downward, so that the burrs at the edges of the first connecting plate 133 and the burrs at the edges of the second connecting plate 134 extend toward the side away from the insertion space 135, thereby greatly reducing the risk of the burrs scratching the tab 302 and improving the production yield.

Illustratively, in this implementation, the adapter 1 may include one metal foil, so as to save the cost, reduce the weight, and facilitate the bending of the adapter 1. In some other implementations, the adapter 1 may also include multiple metal foils. All the metal foils are stacked and folded in half along the first half-folding axis P1 to form two layers of adapter main bodies 110. All the metal foils are integrated into an integral structure. Therefore, by configuring the adapter 1 as a multi-layer stacked structure, the thickness of the stacked structure is increased so as to better absorb and disperse the stress during bending, thereby avoiding the problem of breakage of the adapter 1 during the bending. Moreover, the integration of all the metal foils into an integral structure ensures that the tab 302 is not damaged, and can be smoothly inserted between the two layers of adapter main bodies 110. In addition, after the innermost layer of metal foil is fused, a circuit between the first connecting portion 11 and the second connecting portion 13 can be disconnected quickly, and the limiting member 3 can further prevent the outermost layer of metal foil from creeping, which is likely to lead to the problem of overlapping joint between the first connecting portion 11 and the second connecting portion 13. The metal foil may be, but not limited to, an aluminum foil, a copper foil, etc. The metal foil has a thickness T of 0.02 mm-0.4 mm, so as to enhance the overall structural strength of the adapter 1 and facilitate the bending process.

Figure 13:
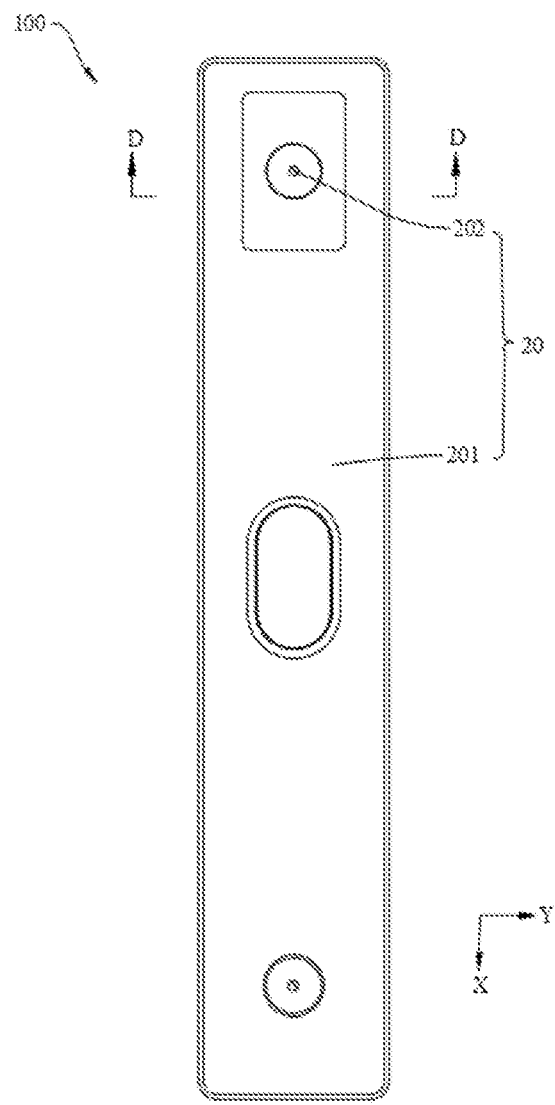
FIG. 13 is a top view of the energy storage device in FIG. 1.
Figure 14:
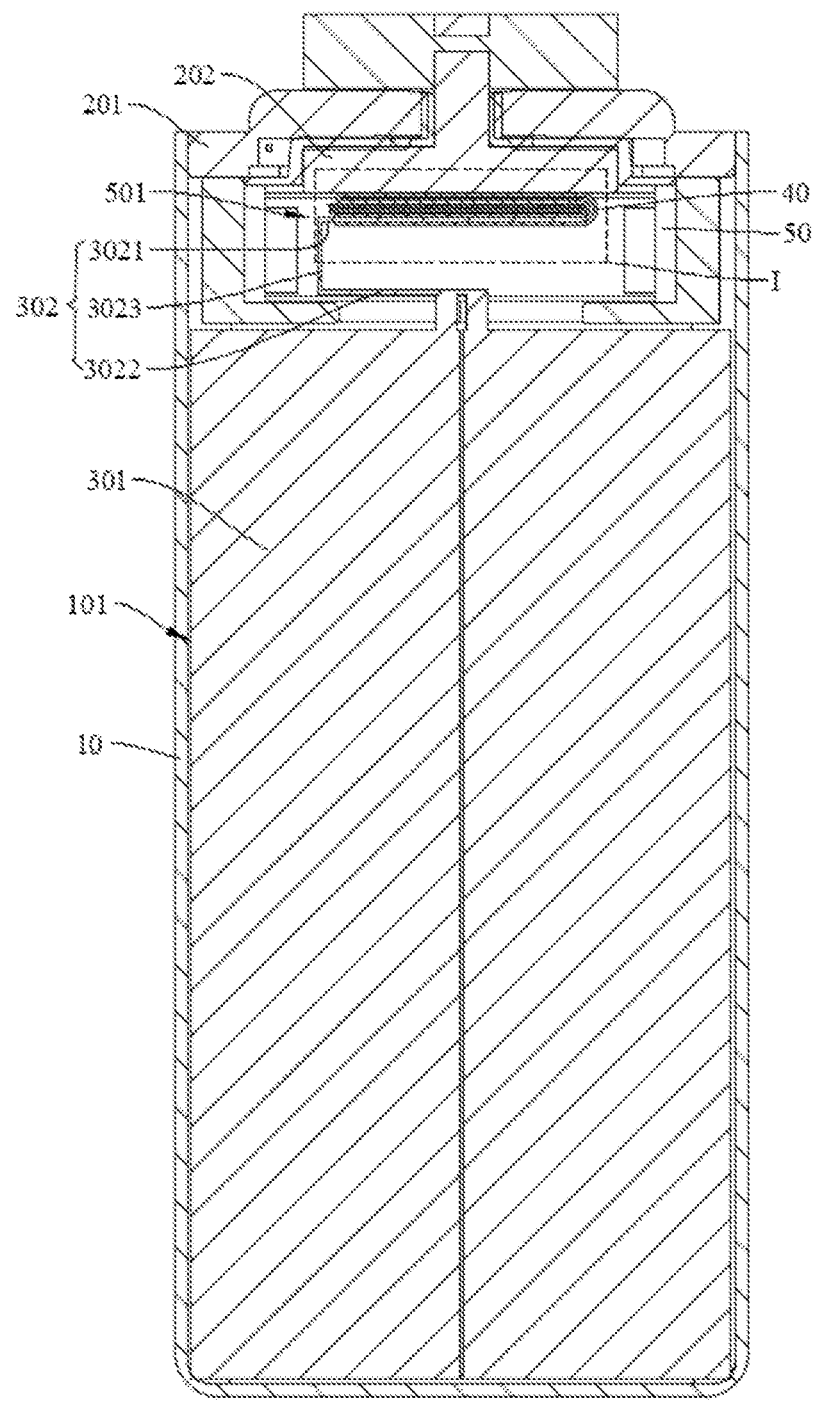
FIG. 14 is a cross-sectional view of the energy storage device in FIG. 13 along line D-D.
Figure 15:
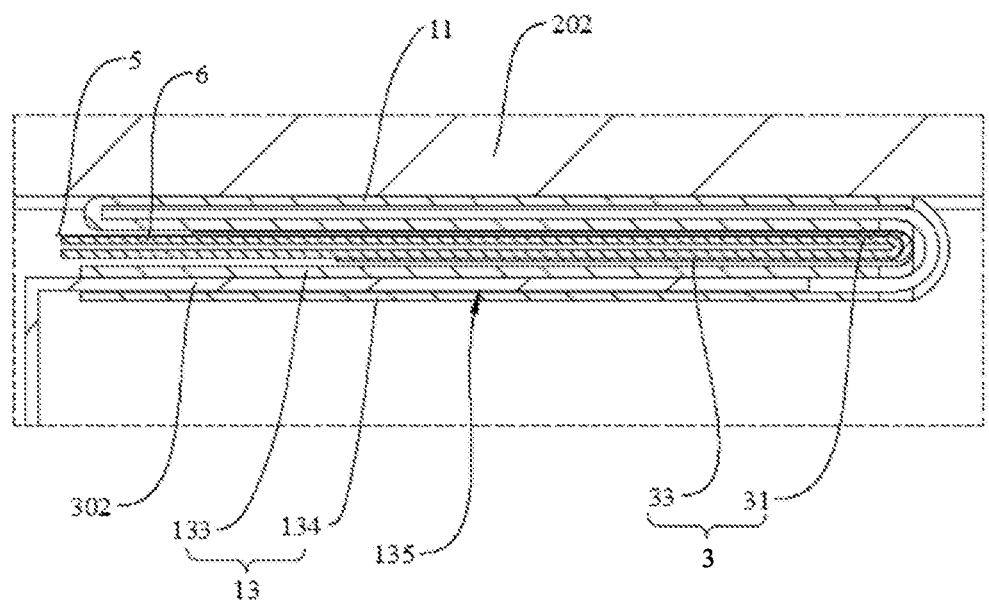
FIG. 15 is an enlarged view of part I of the energy storage device in FIG. 14.
Figure 16:
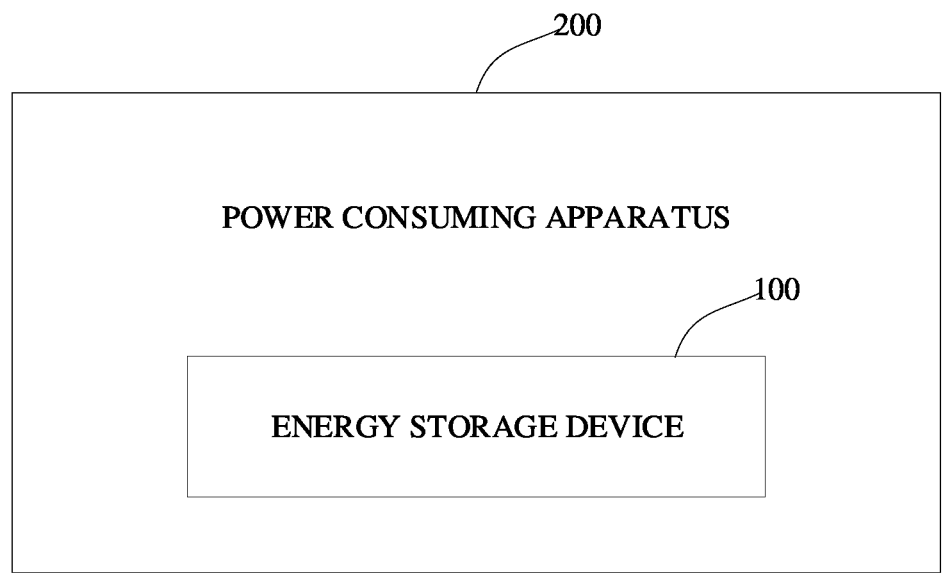
FIG. 16 is a schematic block diagram of a power consuming apparatus.

Referring to FIGS. 13 to 15, FIG. 13 is a top view of the energy storage device 100 in FIG. 1; FIG. 14 is a cross-sectional view of the energy storage device in FIG. 13 along line D-D; and FIG. 15 is an enlarged view of part I of the energy storage device in FIG. 14. After the first connecting portion 11 is rotated and folded with respect to the second connecting portion 13, the first connecting portion 11, the limiting body 31, the first insulating film 5, the second insulating film 6, the movable rotary cover 33 and the second connecting portion 13 are stacked in the thickness direction of the adapter assembly 40, so as to effectively reduce the thickness of the adapter 1 and further meet the market demand for the miniaturization of the adapter 1.

The rotating and folding of the first connecting portion 11 with respect to the second connecting portion 13 can drive the movable rotary cover 33 to rotate and bend relative to the limiting body 31, such that the first insulating film 5 and the second insulating film 6 are pressed between the limiting body 31 and the movable rotary cover 33. The displacement of the first insulating film 5 and the second insulating film 6 is avoided. Moreover, after the movable rotary cover 33 is rotated and bent relative to the limiting body 31, the thickness of the limiting member 3 in the thickness direction of the adapter assembly 40 is increased to better absorb and disperse the stress during bending, so as to avoid the problem of breakage of the adapter 1 during the bending.

The tab 302 extends into the limiting groove 501 of the lower plastic member and is received in the insertion space 135 formed between the first connecting plate 133 and the second connecting plate 134, thereby enabling the tab 302 to be clamped by the first connecting plate 133 and the second connecting plate 134. Specifically, the tab 302 includes a first connecting section 3021 connected to the battery cell 301, a second connecting section 3022 connected to the second connecting portion 13, and a third connecting section 3023 connected to the first connecting section 3021 and the second connecting section 3022. The first connecting section 3021 and the second connecting section 3022 are spaced apart from each other, and are both bent in the same direction relative to the third connecting section 3023, so that the degree of bending of the tab 302 can be improved, and the internal space of the energy storage device 100 can be effectively saved. At the same time, the tab 302 is prevented from coming into contact with the adapter 1 during bending, thereby preventing a short circuit in the energy storage device 100 and increasing the energy density of the energy storage device 100.

The implementations of the present disclosure have been described in detail above, and specific examples are used for illustrating principles and implementations of the present disclosure herein. The above description of the implementations is only used for helping to understand the method and its core concept of the present disclosure. In addition, for those of ordinary skill in the art, changes may be made the specific implementations and the scope of application according to the concept of the present disclosure. In conclusion, the content of the specification should not be construed as a limitation to the present disclosure.

What is claimed is:

1. An adapter assembly, comprising:
   an adapter, comprising a first connecting portion, a second connecting portion, and a bendable connecting portion connected between the first connecting portion and the second connecting portion, the first connecting portion being arranged opposite the second connecting portion; and
   a limiting member, wherein the limiting member is located between the first connecting portion and the second connecting portion foldable with respect to each other, and the limiting member is insulated from the adapter, wherein the limiting member has a limiting face configured to abut against the bendable connecting portion, and the bendable connecting portion is configured to rotate and bend around the limiting face; the limiting member comprises a limiting body and a movable rotary cover rotatably connected to the limiting body, the first connecting portion comprises a first welding area, the limiting body defines a window for exposing the first welding area, the adapter assembly further comprises a first insulating film, and the first insulating film is arranged at the window and shields the window; the first insulating film is clamped between the limiting body and the movable rotary cover; the limiting body is fixed to the first connecting portion via the first insulating film; side walls of the window and the first insulating film enclose a storage tank; the movable rotary cover comprises a fixing portion connected to the limiting body, and an extension portion connected to one side of the fixing portion facing away from the limiting body; and the extension portion shields part of the window.

2. The adapter assembly according to claim 1, wherein the limiting member has a thickness of 0.03 mm-5 mm in a thickness direction of the adapter assembly.

3. The adapter assembly according to claim 1, wherein the limiting body is configured to abut against the first connecting portion, and the movable rotary cover is configured to abut against the second connecting portion.

4. The adapter assembly according to claim 3, wherein the first connecting portion, the limiting body, the movable rotary cover and the second connecting portion are stacked in sequence in the thickness direction of the adapter assembly.

5. The adapter assembly according to claim 3, wherein the limiting body is integrally formed with the movable rotary cover, and the limiting member is configured as a bendable structure.

6. The adapter assembly according to claim 1, wherein a ratio of a length of the window to a length of the limiting body is 0.2-0.5.

7. The adapter assembly according to claim 1, wherein the limiting body is adhesively fixed to the first connecting portion.

8. The adapter assembly according to claim 1, wherein the adapter assembly further comprises a second insulating film, and the second insulating film being clamped between the first insulating film and the movable rotary cover.

9. The adapter assembly according to claim 8, wherein the second connecting portion comprises a second welding area, and the movable rotary cover defines a notch at a position corresponding to the second welding area to expose the second insulating film.

10. The adapter assembly according to claim 9, wherein an orthographic projection of the notch on the first insulating film is spaced apart from an orthographic projection of the window on the first insulating film.

11. The adapter assembly according to claim 8, wherein the second insulating film comprises a first film body attached to the first insulating film and a second film body foldable with respect to and connected to the first film body, and the second film body faces the second connecting portion.

12. The adapter assembly according to claim 1, wherein the bendable connecting portion defines a through hole to form, on two opposite sides of the through hole, a first fuse portion and a second fuse portion connected to the first connecting portion and the second connecting portion, and the limiting member shields at least a part of the through hole.

13. The adapter assembly according to claim 1, wherein the limiting member is of a plastic structure.

14. An energy storage device, comprising a terminal post, a tab, and an adapter assembly, wherein the adapter assembly comprises:
  an adapter, comprising a first connecting portion, a second connecting portion, and a bendable connecting portion connected between the first connecting portion and the second connecting portion, the first connecting portion being arranged opposite the second connecting portion; and
  a limiting member, wherein the limiting member is located between the first connecting portion and the second connecting portion foldable with respect to each other, and the limiting member is insulated from the adapter, wherein the limiting member has a limiting face configured to abut against the bendable connecting portion, and the bendable connecting portion is configured to rotate and bend around the limiting face; the limiting member comprises a limiting body and a movable rotary cover rotatably connected to the limiting body, the first connecting portion comprises a first welding area, the limiting body defines a window for exposing the first welding area, the adapter assembly further comprises a first insulating film, and the first insulating film is arranged at the window and shields the window; the first insulating film is clamped between the limiting body and the movable rotary cover; the limiting body is fixed to the first connecting portion via the first insulating film; side walls of the window and the first insulating film enclose a storage tank; the movable rotary cover comprises a fixing portion connected to the limiting body, and an extension portion connected to one side of the fixing portion facing away from the limiting body; and the extension portion shields part of the window; wherein,
  the first connecting portion of the adapter assembly is electrically connected to the terminal post, and the second connecting portion of the adapter assembly is electrically connected to the tab.

15. The energy storage device according to claim 14, wherein the limiting member has a thickness of 0.03 mm-5 mm in a thickness direction of the adapter assembly.

16. The energy storage device according to claim 14, wherein the limiting body is configured to abut against the first connecting portion, and the movable rotary cover is configured to abut against the second connecting portion.

17. The energy storage device according to claim 16, wherein the first connecting portion, the limiting body, the movable rotary cover and the second connecting portion are stacked in sequence in the thickness direction of the adapter assembly.

18. The energy storage device according to claim 16, wherein the limiting body is integrally formed with the movable rotary cover, and the limiting member is configured as a bendable structure.

19. The energy storage device according to claim 14, wherein a ratio of a length of the window to a length of the limiting body is 0.2-0.5.

20. A power consuming apparatus comprising an energy storage device, the energy storage device supplying electric energy to the power consuming apparatus, wherein the energy storage device comprises a terminal post, a tab, and an adapter assembly, wherein the adapter assembly comprises:
  an adapter, comprising a first connecting portion, a second connecting portion, and a bendable connecting portion connected between the first connecting portion and the second connecting portion, the first connecting portion being arranged opposite the second connecting portion; and a limiting member, wherein the limiting member is located between the first connecting portion and the second connecting portion foldable with respect to each other, and the limiting member is insulated from the adapter, wherein the limiting member has a limiting face configured to abut against the bendable connecting portion, and the bendable connecting portion is configured to rotate and bend around the limiting face; the limiting member comprises a limiting body and a movable rotary cover rotatably connected to the limiting body, the first connecting portion comprises a first welding area, the limiting body defines a window for exposing the first welding area, the adapter assembly further comprises a first insulating film, and the first insulating film is arranged at the window and shields the window; the first insulating film is clamped between the limiting body and the movable rotary cover; the limiting body is fixed to the first connecting portion via the first insulating film; side walls of the window and the first insulating film enclose a storage tank; the movable rotary cover comprises a fixing portion connected to the limiting body, and an extension portion connected to one side of the fixing portion facing away from the limiting body; and the extension portion shields part of the window; wherein, the first connecting portion of the adapter assembly is electrically connected to the terminal post, and the second connecting portion of the adapter assembly is electrically connected to the tab.

* * * * *